(12) United States Patent
Nevarez

(10) Patent No.: US 10,905,948 B1
(45) Date of Patent: *Feb. 2, 2021

(54) GAME CONTROLLER FOR HAND-HELD ELECTRONIC DEVICES HAVING A TOUCH SCREEN DISPLAY

(71) Applicant: James F. Nevarez, Visalia, CA (US)

(72) Inventor: James F. Nevarez, Visalia, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/396,728

(22) Filed: Apr. 28, 2019

Related U.S. Application Data

(63) Continuation-in-part of application No. 15/619,402, filed on Jun. 9, 2017, now Pat. No. 10,272,325.

(51) Int. Cl.
   *G06F 3/044* (2006.01)
   *A63F 13/24* (2014.01)
   *G06F 3/0354* (2013.01)
   *G06F 3/0488* (2013.01)

(52) U.S. Cl.
   CPC .......... *A63F 13/24* (2014.09); *G06F 3/03545* (2013.01); *A63F 2300/1043* (2013.01); *G06F 3/0488* (2013.01)

(58) Field of Classification Search
   CPC ....................................................... A63F 13/98
   See application file for complete search history.

(56) References Cited

U.S. PATENT DOCUMENTS

| | | |
|---|---|---|
| 6,995,751 B2 | 2/2006 | Falvo |
| 8,988,356 B2 | 3/2015 | Tseng |
| 9,411,467 B2 | 8/2016 | Argiro |
| 9,465,468 B2 | 10/2016 | Lee et al. |
| 2004/0137983 A1 | 7/2004 | Kerr et al. |
| 2006/0256090 A1 | 11/2006 | Huppi |
| 2010/0081505 A1 | 4/2010 | Alten et al. |
| 2013/0120258 A1 | 5/2013 | Maus |
| 2014/0247246 A1 | 9/2014 | Maus |
| 2015/0031452 A1 | 1/2015 | Rundell et al. |

*Primary Examiner* — Lawrence S Galka
(74) *Attorney, Agent, or Firm* — Richard A. Ryan

(57) ABSTRACT

A game controller for use with a hand-held electronic device having a touch screen display, such as a smart phone or tablet, for more comfortably and easily playing a video game on the electronic device. The game controller has one or more control assemblies that define a securing mechanism for securing the electronic device in the game controller. In a preferred configuration, the securing mechanism clamps against the sides of the electronic device. Each control assembly has one or more screen engaging mechanisms that are configured to contact the touch screen display. The screen engaging mechanisms include a trigger that is mechanically connected to a stylus having a capacitive tip. The user can rapidly and repeatedly press the trigger to drive the tip against the touch screen display to control the game and/or one or more game objects thereof. The game controller can include one or more user handles.

19 Claims, 22 Drawing Sheets

GAME CONTROLLER FOR HAND-HELD ELECTRONIC DEVICES HAVING A TOUCH SCREEN DISPLAY

CROSS-REFERENCE TO RELATED APPLICATIONS

This patent application is a continuation-in-part of U.S. patent application Ser. No. 15/619,402 filed Jun. 9, 2017, which issued as U.S. Pat. No. 10,272,325 on Apr. 30, 2019.

STATEMENT REGARDING FEDERALLY SPONSORED RESEARCH

Not Applicable.

REFERENCE TO A SEQUENCE LISTING, A TABLE OR A COMPUTER PROGRAM LISTING APPENDIX SUBMITTED ON A COMPACT DISC

Not Applicable.

BACKGROUND OF THE INVENTION

A. Field of the Invention

The field of the present invention relates generally to video games and game controllers that are utilized to play or otherwise control such video games. In particular, the present invention relates to video games that can be played on a hand-held electronic device having a touch screen display that is utilized to control and display the video game and to game controllers which are utilized with such electronic devices. Even more particularly, the present invention relates to game controllers that are configured to support such electronic devices and to control the movement and/or other action of objects that are displayed on the touch screen display by the electronic device.

B. Background

For many years electronic devices have had a display screen that is directly associated with the electronic device, either by being attached to the device via an electronic cord or integrally incorporated within the device, that displays information which is produced by the device. The display screen of traditional electronic devices only display the information for the user without the ability of the user to effect any change to the device by directly touching or otherwise interacting with the screen. As well known in the art, however, many electronic devices now utilize touch screen displays that are typically, but not exclusively, incorporated into the electronic device and are configured to both display information and allow the user to interact with and operate the device by touching the screen. Examples of electronic devices that have touch screen displays are laptop computers, computer monitors for desk-type computers, smart phones, tablets and the like. These and like devices are generally referred to as a "touch screen device" or collectively as "touch screen devices".

A typical touch screen device comprises a case that encloses the electronic components of the device and an upper surface with a useable screen surface that displays information from the touch screen device and which allows the user to interact with the touch screen device. As well known, the electronic components allow the user to accomplish a wide variety of different computer or computer-related tasks, including running computer programs and applications, by pressing or moving a finger or stylus-type tool across the useable screen surface of the device. One major benefit of touch screen devices is that the user can start the device, operate the device, interact with programs stored in the device, enter data and other information into the programs to achieve desired results and accomplish a wide variety of other objectives without the need for a mouse, keyboard, keypad or other user interactive mechanisms that would otherwise normally be required to accomplish these objectives.

Many people enjoy playing video games that have one or more objects which are displayed on a video display screen, such as a television, computer monitor, laptop computer, smart phone, tablets and the like. The objects may be a person, person-like character, animals, vehicles, aliens, dinosaurs and a wide range of other objects that are capable of moving and/or performing other actions, including operating weapons, vehicles and the like, that enhance the user's game playing experience. All such video games require some type of control system. Perhaps the most common video control system comprises a game console that internally houses the computer control components and a game controller that operatively connects, either by wire or wirelessly, to the game console to allow the user/player to operate the system and control the movement and other actions of the objects that are displayed by the game controller on the screen. More recently, such video games have also been made available for use on smaller, hand-held electronic devices, including smart phones, tablets and the like, with the electronic components thereof comprising the game system. Virtually all such game systems are configured for the player to compete against the video game system itself and to compete against other players playing the same game, who may or may not be in the same physical location (such as a living room or bedroom) as the player. In fact, most modern video game systems are configured for the user to play against persons who may be located remotely relative to the player, often very remotely (such as playing against a person who is located in a different state or country), from the player via a connection to the Internet.

As a result of the advances in technology with regard to touch screen devices, particularly hand-held electronic devices, another common use of touch screen devices is to play games for fun and/or education. Such devices allow the user to touch or move his or her finger across the useable screen area of the touch screen device to cause one or more objects to move or engage in other action that is part of the game being played on the touch screen device. As well known, the useable screen area of touch screen devices generally defines a smooth upper surface (even if a screen protector is placed thereon). Unfortunately, the rapid or variable movement of the person's finger or a stylus to move or otherwise operate or engage a game object can result in the finger or stylus unintentionally touching or moving across the touch screen in a manner that the player of a game did not intend. Typically, such unintentional movement is somewhat harmful to the desired play of the game and, for some types of game play, can result in complete failure to accomplish the objective of the game. To the person playing a video game, the unintentional movement and resulting action or non-action of the game object can be quite frustrating and substantially interfere with his or her fun and/or learning experience.

As well known in the art, most video game systems utilize video game controllers that are sized and configured to be comfortably held in the player's hand and to allow the player to control the movement and other action of one or more objects that are displayed on the associated display screen by the game. A typical video game controller has a plurality of buttons and/or other components that are manipulated by the player to actively control one or more objects that are displayed on the display screen. These components are, typically, positioned on the game controller to allow the player to use his or her thumbs and fingers to operate the components and, as a result, control the movement and/or action of the objects on the display screen. The game controller connects to a game console, computer or like device via a wired connection or wirelessly (i.e., Bluetooth® or the like). With regard to touch screen devices, including hand-held electronic devices such as smart phones, tablets and the like, the player plays the game by touching certain designated locations on the display screen or on-screen "buttons" to move the objects or otherwise control the game.

The much smaller size of the display screen makes accurate operation of a video game somewhat more difficult on hand-held electronic devices and, as such, causes significantly more problems for a person who desires to play games on such devices than would occur on larger-sized display screens. Such problems are particularly an issue for "shooter" type video games that have multiple controls which require the player to touch several buttons at once or in quick succession. As generally well known to persons who play video games on hand-held electronic devices, the position that a player has to put his or her hands and fingers on the display screen is not natural and it is difficult to both hold the device and operate the controls. The player's hands can tire quickly due to the contorted positions a player must assume to effectively play many video games. In fact, the difficulty associated with playing video games on hand-held electronic devices tends to discourage many people from even attempting to play such games, specially shooter-type games, on hand-held electronic devices.

What is needed, therefore, is a new apparatus that is specifically configured to facilitate video game play on a hand-held electronic device, such as a smart phone, tablet or the like. The new apparatus should be structured and arranged as a combined holding apparatus and a game controller that securely holds the hand-held electronic device in a manner that allows the player to utilize his or her hands to operate the game controller portion thereof. The apparatus should be configured to hold the electronic device in position in front of the player in a manner such that he or she can clearly see the game playing on the display screen thereof and so the game controller portion of the apparatus can access the device's touch screen display. The game controller of the new apparatus should be configured to operatively contact the appropriate positions on the touch screen display where the game controls are electronically positioned and to be selectively controlled by the player so as to control the objects of the game as necessary and/or desired by the player as he or she plays a video game. The new apparatus should be configured so as to be able to be comfortably held in the player's hands (even for relatively long periods of time), easy to use and relatively inexpensive to manufacture.

SUMMARY OF THE INVENTION

The following presents a simplified summary of the disclosure of the present invention in order to provide a basic understanding of the invention to the reader. As such, this Summary is not an extensive overview of the disclosure and it does not identify key/critical elements of the invention or delineate the scope of the invention. The sole purpose of this Summary is to present some concepts disclosed herein in a simplified form as a prelude to the more detailed description that is presented later.

The use of terms such as "including", "comprising" or "having" and variations thereof herein is meant to encompass the items listed thereafter and equivalents thereof. The terms "a" and "an" herein do not denote a limitation of quantity, but rather denote the presence of at least one of the referenced item. Further, the use of terms "first", "second", and "third", and the like, herein do not denote any order, quantity, or importance, but rather are used to distinguish one element from another.

The game controller for hand-held electronic devices of the present invention provides the benefits and solves the problems identified above. That is to say, the present invention is directed to a new game controller which is particularly configured for use with hand-held electronic devices having a touch screen display. For purposes of the present invention, the term "hand-held electronic devices" or more simply as "electronic devices" is utilized to refer to smart phones, tablets and other similarly configured devices. The game controller of the present invention is structured and arranged to securely hold a hand-held electronic device while it is being utilized to play a video game or the like in a manner which allows the game player to effectively operate the game with his or her hands. The game controller is configured to hold an electronic device in front of the game player in a manner that allows the player to clearly see the game playing on the display screen thereof and to allow him or her to use the game controller's mechanisms to contact the electronic device's touch screen display. The various mechanisms of the new game controller of the present invention are structured and arranged to operatively contact the appropriate positions on the touch screen display where the controls for the game are electronically positioned to allow the player to selectively control the objects of the game as necessary and/or desired by the player as he or she plays the video game. The new game controller for hand-held electronic devices of the present invention is configured to be comfortably held in the player's hands (even for relatively long periods of time), adaptable for different sizes and types of hand-held electronic devices, easy to use and relatively inexpensive to manufacture.

In the preferred embodiments of the present invention, the new game controller for hand-held electronic devices having a touch screen display generally comprises at least one control assembly having a device securing mechanism and a screen engaging mechanism. The device securing mechanism is structured and arranged to securely hold the electronic device in a device receiving area in a manner that directs the touch screen display toward a user who is utilizing the game controller to play the video game on the electronic device when the device securing mechanism is in a closed position and to allow the electronic device to be removed from the device receiving area when the device securing mechanism is in an open position. The screen engaging mechanism is structured and arranged to move a capacitive tip from a disengaged position with the capacitive tip in spaced apart relation to the touch screen display to an engaged position with the capacitive tip pressed against the touch screen display when the user applies pressure to a trigger that is operatively connected to the capacitive tip so as to contact a control point of the video game to affect the video game and/or one or more game objects thereof while the user is holding one of the game controller and the electronic device and to move the capacitive tip back to the disengaged position when the user releases pressure from the trigger. In various embodiments, the new game controller can have multiple control assemblies and/or control assemblies with multiple screen engaging mechanisms to engage additional control points.

In a preferred configuration, the device securing mechanism of the game controller comprises an upper body having an upper lip member and a lower body having a lower lip member, with the upper body and the lower body defining the device receiving area between the upper lip member and the lower lip member. A biasing mechanism can be utilized to interconnect the upper body and the lower body, with the biasing mechanism being structured and arranged to bias the upper lip member and the lower lip member toward each other to clamp the electronic device between the upper lip member and the lower lip member when the game controller is utilized to hold the electronic device for playing the video game. In a typical arrangement, the upper lip member will be clamped against a first side of the electronic device and the lower lip member will be clamped against a second side of the electronic device. In a preferred configuration, the biasing mechanism is disposed in a biasing chamber of either the upper body and the lower body, such as handles attached to or integral with the lower body, with the biasing chamber being sized and configured to receive a connecting member that connects the other of the upper body and the lower body in order to bias one of the upper body and the lower body toward the other of the upper body and the lower body.

Preferably, the game controller has one or more handles that are attached to or integrally formed with either the upper body or the lower body of the device securing mechanism, with the handles being sized and configured to be held by the user when the user is utilizing the game controller to play the video game on the electronic device. In a preferred configuration, the game controller comprises a pair of handles that are moveably attached to the one of the upper body and the lower body to allow the user to adjust the distance between the pair of handles. In one configuration, each of the handles have a handle support member that is sized and configured to moveably engage an internal chamber in handle receiving members that are attached to or integral with either the upper body or the lower body.

The screen engaging mechanism further comprises a connecting arm that interconnects the trigger and a support arm that is attached to or integral with a capacitive stylus that is supporting the capacitive tip to mechanically connect the trigger to the capacitive tip. Each of the trigger, connecting arm and support arm are structured and arranged to direct the capacitive tip against the touch screen display of the electronic device when the user engages the trigger, typically by applying pressure to the trigger (i.e., pressing on the trigger). In a preferred configuration the support arm is slidably and pivotally disposed relative to the connecting arm to allow the user to adjust the position of the capacitive tip by moving the support arm toward or away from the device receiving area and pivoting the capacitive stylus as necessary to cooperatively position the capacitive tip with the control points of the video game. The game controller can also include a mounting surface that is associated with the connecting arm and a mounting member attached to an adjusting mechanism associated with the support arm, with the mounting member being disposed through a slot in the support arm to allow the support arm to move relative to the mounting surface. The new game controller can also include a trigger tensioning mechanism that is associated with the screen engaging mechanism to bias the capacitive tip away from the touch screen display when the user releases pressure from the trigger to prevent inadvertent contact with the touch screen display. In some embodiments, the trigger tensioning mechanism can be configured to allow the user to adjust the tension of the trigger In one embodiment, the new game controller comprises a first control assembly and a second control assembly, with each of the control assemblies defining the device securing mechanism and each of the control assemblies having one or more of the screen engaging mechanisms. The control assemblies can be separate or they can be joined together. In one configuration, the game controller has a first connecting member that is associated with the first control assembly, a second connecting member which is associated with the second control assembly and a connecting mechanism for moveably connecting the first connecting member and the second connecting member to allow the user to adjust the distance between the first control assembly and the second control assembly so he or she can place the capacitive tip of each of the control assemblies in corresponding position with one of the control points on the touch screen display.

Accordingly, the primary objective of the present invention is to provide an improved apparatus for use with hand-held electronic devices that has the various advantages discussed above and elsewhere in this disclosure and which is able to overcome the various disadvantages and limitations associated with the prior art apparatuses that are configured for a user to hold a hand-held electronic device while playing a video game thereon.

It is an important object of the present invention to provide a game controller that is configured to securely hold a hand-held electronic device having a touch screen display and to provide control mechanisms that allow a user of the game controller to effectively and comfortably play a video game that requires contact with the touch screen display of the electronic device.

An important aspect of the present invention is that it provides a new game controller that accomplishes the objectives set forth above and elsewhere in the present disclosure.

Another important aspect of the present invention is that it provides a new game controller that is structured and arranged to securely hold a hand-held electronic device having a touch screen display and which has one or more control mechanisms that are positioned to allow a user of the game controller to effectively and comfortably play a video game that requires contact with one or more locations on the touch screen display.

Another important aspect of the present invention is that it provides a new game controller for hand-held electronic devices having a touch screen display that is configured to hold the device in front of the player in a manner that allows him or her to clearly see the game playing on the display screen thereof and to allow him or her to use the game controller's control mechanisms to contact the electronic device's touch screen display.

Another important aspect of the present invention is that it provides a new game controller for use with hand-held electronic devices having a touch screen display that is configured to operatively contact the appropriate positions on the touch screen display where the controls for a video game are electronically positioned to allow the player to selectively control the movement and/or action of the objects on the display screen as necessary and/or desired by the player as he or she plays the video game.

Another important aspect of the present invention is that it provides a new game controller for use with hand-held electronic devices having a touch screen display that is configured to be comfortably held in the player's hands, even for relatively long periods of time, as he or she is playing a video game on the electronic device.

Another important aspect of the present invention is that it provides a new game controller for use with hand-held electronic devices having a touch screen display that is readily adaptable for different sizes of hand-held electronic devices, including smart phones and tablets.

Yet another important aspect of the preferred embodiments of the present invention is that it provides a new game controller for use with hand-held electronic devices that is easy to use and relatively inexpensive to manufacture.

As will be explained in greater detail by reference to the attached figures and the description of the preferred embodiments which follow, the above and other objects and aspects are accomplished or provided by the present invention. As set forth herein and will be readily appreciated by those skilled in the art, the present invention resides in the novel features of form, construction, mode of operation and combination of processes presently described and understood by the claims. The description of the invention which follows is presented for purposes of illustrating one or more of the preferred embodiments of the present invention and is not intended to be exhaustive or limiting of the invention. The scope of the invention is only limited by the claims which follow after the discussion.

BRIEF DESCRIPTION OF THE DRAWINGS

In the drawings which illustrate the preferred embodiments and the best modes presently contemplated for carrying out the present invention.

DETAILED DESCRIPTION OF THE PREFERRED EMBODIMENTS

Figure 1:
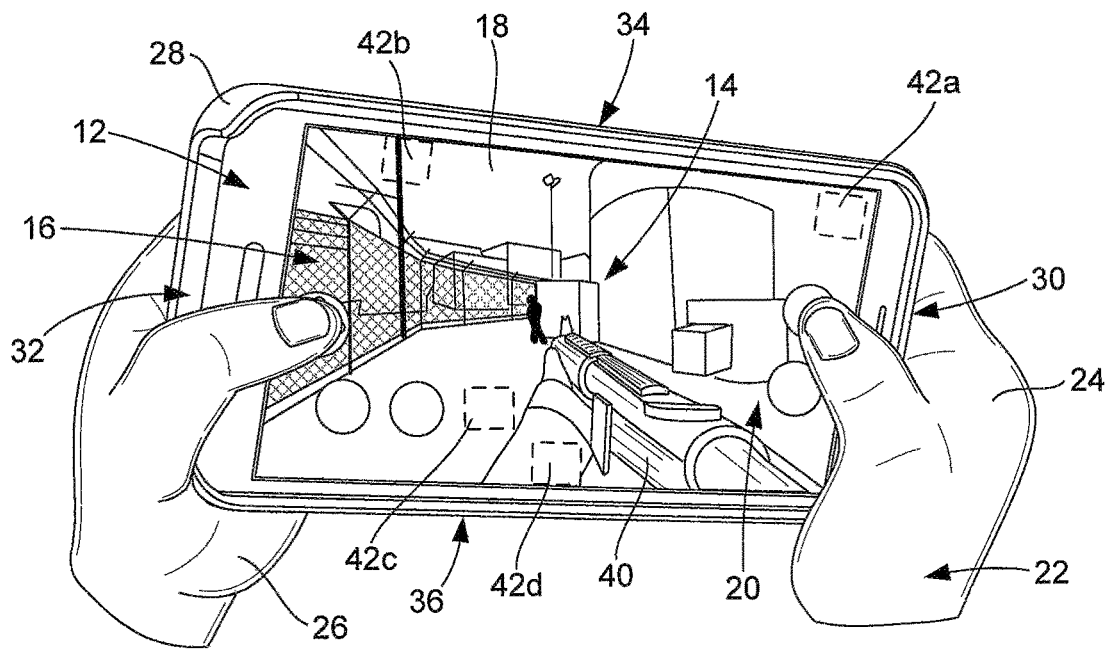
FIG. 1 is a side perspective view of an exemplary prior art hand-held electronic device shown being held in the hands of a user to play an exemplary video game on the electronic device.

With reference to the figures where like elements have been given like numerical designations to facilitate the reader's understanding of the present invention, the preferred embodiments of the present invention are set forth below. The enclosed figures are illustrative of several potential preferred embodiments and, therefore, are included to represent several different ways of configuring the present invention. Although specific components, materials, configurations and uses are illustrated, it should be understood that a number of variations to the components and to the configuration of those components described herein and shown in the accompanying figures can be made without changing the scope and function of the invention set forth herein. For instance, although the description and figures included herewith generally describe and show particular materials, shapes and configurations for the various components of the new game controller of the present invention, as well as the examples of hand-held electronic devices with which the new game controller may be utilized, those skilled in the art will readily appreciate that the present invention is not so limited. In addition, the exemplary embodiments of the present game controller is shown and described herein with only those components that are required to disclose the present invention. As such, it may be possible that some of the necessary elements for attaching and using the present invention are not shown or necessarily described below, but which are well known to persons who are skilled in the relevant art. As will be readily appreciated by such persons, the various elements of the present invention that are described below may take on any form consistent with forms that are readily realized by a person of ordinary skill in the art having knowledge of video games, electronic devices and game controllers for playing video games.

A game controller that is configured pursuant to various embodiments of the present invention is shown generally as 10 in FIGS. 2-9, 11-12 and 15-40. As set forth in more detail below, the game controller 10 of the present invention is structured and arranged to be utilized with a hand-held electronic device 12, an example of which is shown in FIGS. 1-5, 15-16, 19, 21, 23-24 and 27-28, to play a video game 14, as shown in FIG. 2. Although electronic device 12 shown in the figures is a smart phone, persons who are skilled in the art will understand that the electronic device 12 can be a tablet, mini-tablet and the like having a touch screen display 16 in a useable screen area 18 of the upper surface 20 of the electronic device 12. In addition to displaying data and other information, the touch screen display 16 allows the user 22, shown in FIG. 1, to utilize one or more fingers 24 of his or her hands 26 to operate the electronic device 12, enter data into programs, applications and the like that are operated by the electronic device 12 and perform a wide variety of other operations by selectively contacting the touch screen display 16. The electronic device 12 has a case 28 that extends generally between a first end 30 and second end 32 and between a first side 34 to a second side 36 thereof that encloses the electronic components and defines the lower surface 38 of the electronic device 12, as best shown in FIGS. 1-5. In many configurations, the first end 30 is a top end and the second end 32 is a bottom end of the electronic device 12 and the useable screen area 18 of the touch screen display 16 that is bounded on all sides by a non-touch border. The general configuration, use and operation of such hand-held electronic devices 12 are well known in the art.

Figure 2:
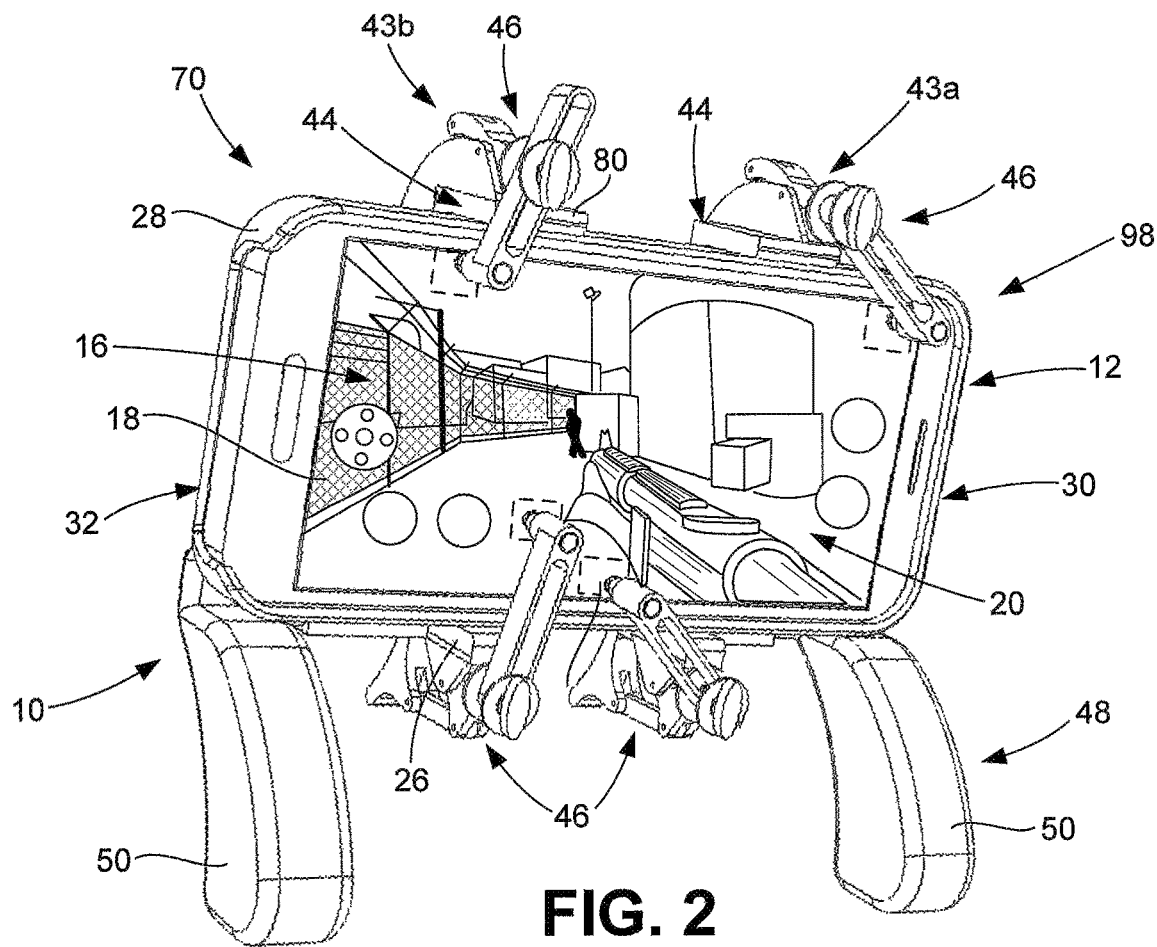
FIG. 2 is a front perspective view of a game controller for hand-held electronic devices that is configured according to a first embodiment of the present invention shown in use with the hand-held electronic device of FIG. 1 with each of the control assemblies in their engaged positions.
Figure 3:
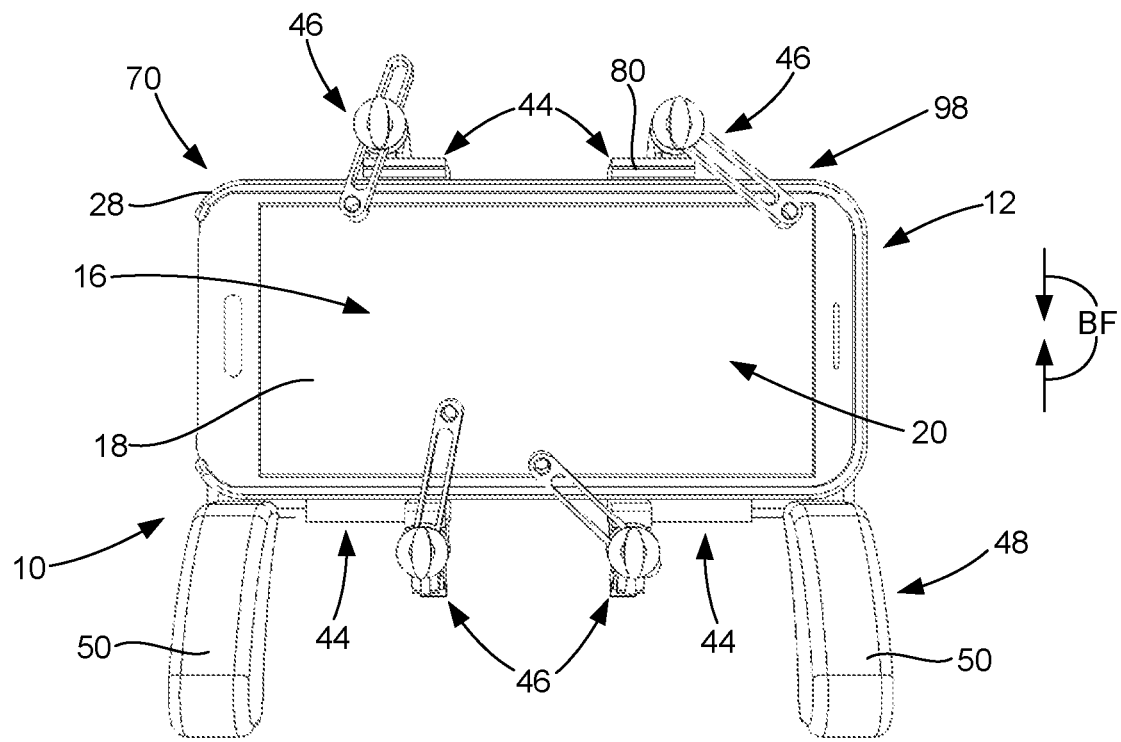
FIG. 3 is a front view of the game controller and electronic device of FIG. 2.
Figure 4:
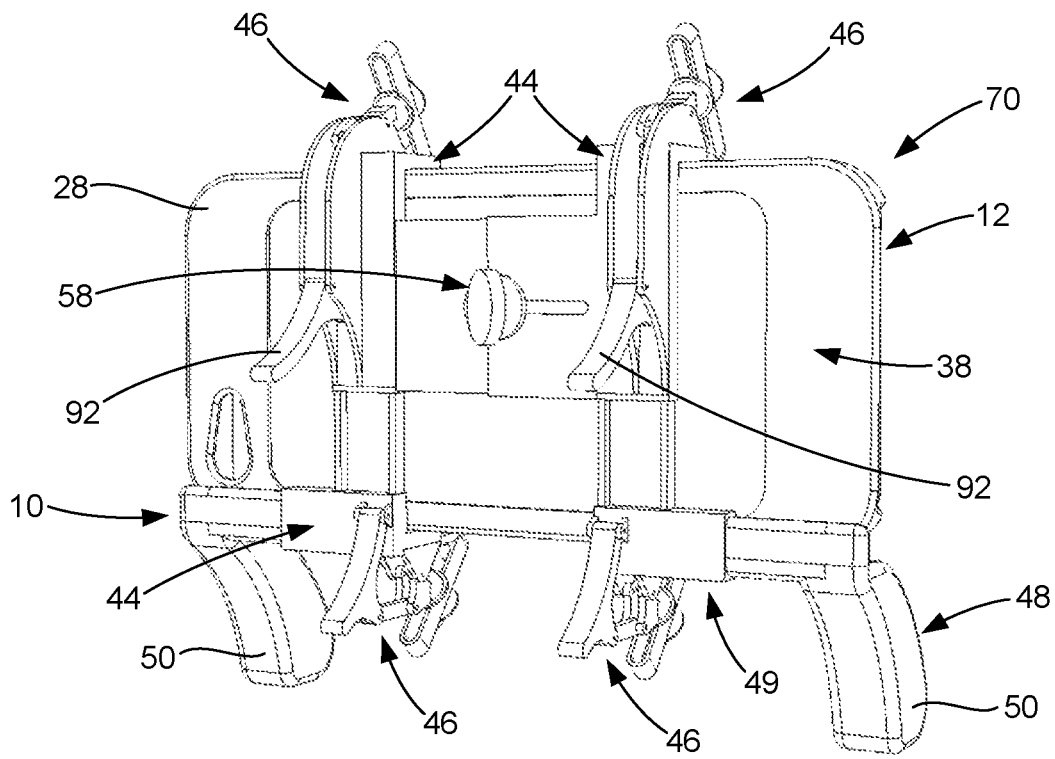
FIG. 4 is a back perspective view of the game controller and electronic device of FIG. 2.
Figure 5:
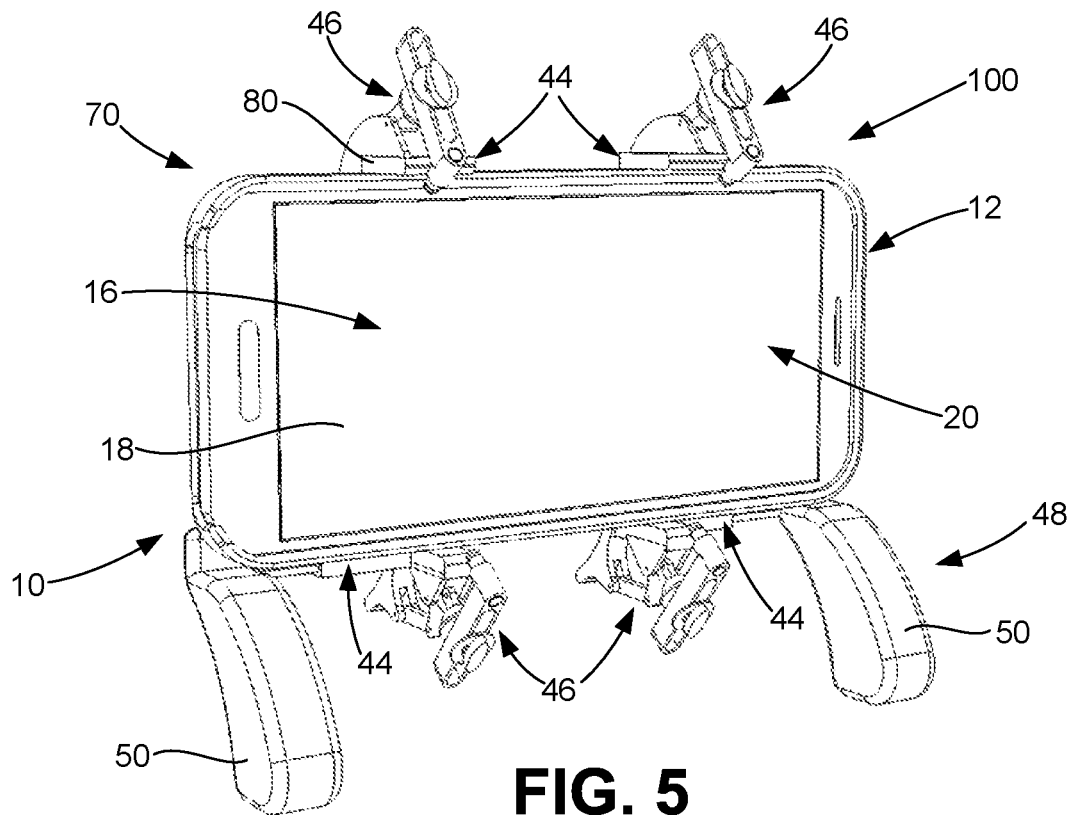
FIG. 5 is a front perspective view of the game controller and electronic device of FIG. 2 with each of the control assemblies in their disengaged positions.
Figure 6:
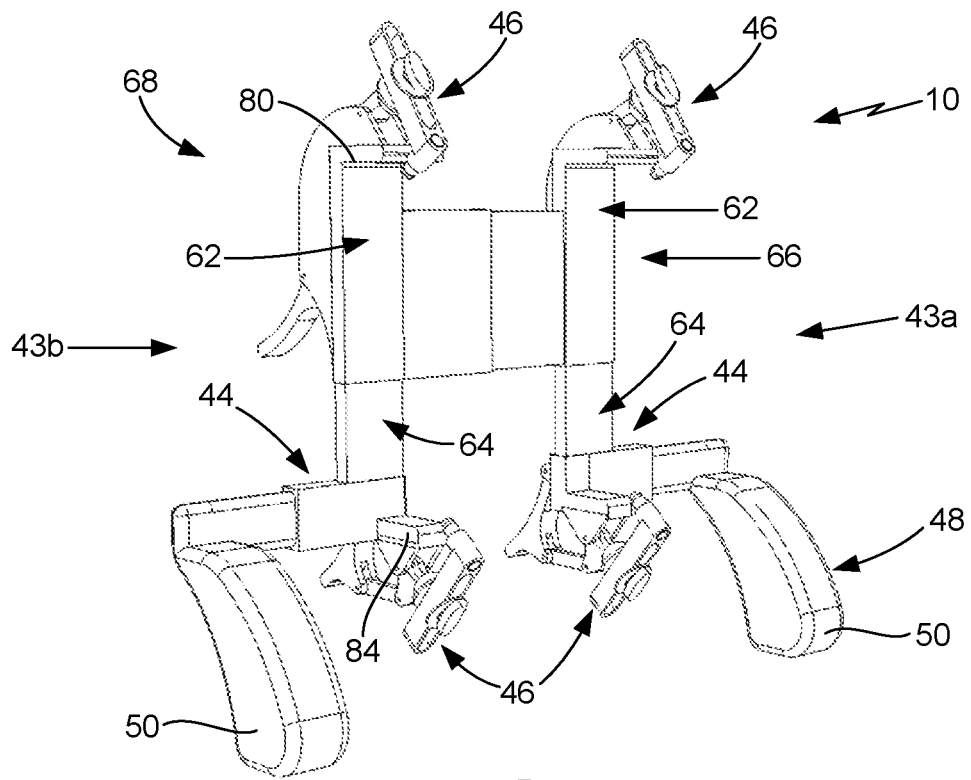
FIG. 6 is a front perspective view of the game controller of FIG. 2 shown without the electronic device.

As generally well known in the art, hand-held electronic devices 12 are commonly utilized to play a video game 14, as shown in FIG. 1 (prior art), by the user 22 holding onto the case 28 with one or more hands 26 and using his or her fingers 24 to operate the electronic device 12. In addition to displaying the game video, data and other information, the touch screen display 16 functions as a touch-operated screen that allows the user 22 to move, manipulate or otherwise control one or more game objects 40 of the video game 14. For purposes of the present invention, the video game 14 can be any type of computer-controlled video game or the like in which the user 22 utilizes one or more of his or her fingers 24 to control a game object 40 to accomplish a game objective. The game object 40 can be a person, animal, character, vehicle and/or any of a wide variety of inanimate objects (i.e., walls, blocks, buildings, letters and the like) that the movement thereof helps the user 22 to accomplish the game objective in a manner which is both fun and entertaining to the user 22. In the example game 14 shown in FIGS. 1 and 2, the game object 40 is a person having one or more weapons and the game objective may be to get to a certain location to rescue a hostage, obtain an object, acquire some information or the like. As will be readily appreciated by those skilled in the art, the user/game player 22 uses one of his or her fingers 24 to move the game object 40 to accomplish its task.

Most video games 14, particularly action-type video games 14, have one or more electronic control points 42 in the useable screen area 18 of the touch screen display 16 of the electronic device 12. Depending on the video game 14, the control points 42 are utilized to accomplish a variety of tasks and/or to modify a game object 40 or objects associated with the game object, such as acquiring an item, changing levels, switching use of one weapon to another, reloading a weapon and the like. As will be readily appreciated by persons who play video games 14, the control points 42 may be electronically positioned virtually anywhere in the useable screen area 18 of the touch screen display 16. In FIGS. 1 and 2, the video game 14 has four control points, shown as 42a, 42b, 42c and 42d. When playing the video game 14, the user 22 accesses the features represented by the control points 42 using his or her fingers 24 (which includes the thumbs) to touch the touch screen display 16 at the control points 42. As set forth in the Background, the user 22 usually has to rapidly and repeatedly access the control points 42 while playing the video game 14 and to do so while he or she is also holding the electronic device 12 in his or her hands 26, which often results in the user 22 having to place his or her hands 26 or fingers 24 in somewhat contorted positions. As well known in the art, the contorted positions can quickly result in his or her hands 26 tiring and, over time, becoming somewhat sore from playing the video game 14. Such difficulty and discomfort can discourage persons from playing video games 14 on hand-held electronic devices 12 despite the availability of such devices 12.

As will be readily appreciated by persons who are skilled in the art, the video game 14, game object 40 and control points 42 described above and shown in the video game 14 of FIGS. 1 and 2 are provided for exemplary purposes only to help explain the new game controller 10 of the present invention. Such persons will also appreciate that the game controller 10 can be utilized with a wide range of different types of video games 14 having a wide variety of different types of game objects 40 and number and location of electronic control points 42 on the useable screen area 18 of the touch screen display 16 that the user 22 contacts with one of his or her fingers 24 while playing the video game 14.

A first embodiment of the game controller 10 of the present invention is shown in FIGS. 2-12. In this embodiment, the game controller 10 has two control assemblies 43a and 43b that are joined together to form the single game controller 10, with the first control assembly 43a being generally toward the first end 30 of the electronic device 12 and the second control assembly 43b being generally toward the second end 32 of the electronic device 12 when the game controller 10 is being utilized to play a video game 14 on the electronic device 12, as best shown in FIG. 2. Each control assembly 43a/43b generally comprises a device securing mechanism 44 for securely holding the electronic device 10, a screen engaging mechanism 46 for engaging the touch screen display 16 at the control points 42 and a user support mechanism 48 that allows the user 22 to hold onto the game controller 10 separate from the electronic device 12, as best shown in FIGS. 2-8 and 11-12. The user support mechanism 48 comprises a pair of handles 50 that are sized and configured to be comfortably held in the hands 26 of the user 22 while he or she is utilizing the game controller 10 to play the video game 14. In a preferred configuration, the handles 50 are configured to position the touch screen display 16 in front of the user 22 as he or she plays the video game 14 on a hand-held electronic device 12 with the new game controller 10 of the present invention. As set forth below, in other embodiments, the new game controller 10 does not include the user support mechanism 48.

In the embodiment of new game controller 10 shown in FIGS. 2-12, FIGS. 19-22 and FIG. 27, the two control assemblies 43a/43b are joined together to form the game controller 10 using a first connecting member 52, a second connecting member 54 and a connecting mechanism 56 that is loosened to allow the two connecting members 52/54 to move relative to each other and tightened to fix the position of the two connecting members 52/54 relative to each other and to the electronic device 12. Each of the connecting members 52/54 and connecting mechanism 56 are cooperatively sized and configured so the connecting members 52/54 can slide relative to each other to move the control assemblies 43a/43b either closer together or further apart to accommodate different lengths (i.e., first end 30 to second end 32) of electronic devices 10. In the embodiment shown, the connecting members 52/54 are telescopically arranged so one of the connecting members 52/54 will slide in and out of the other connecting member 52/54 and the connecting mechanism 56 comprises a knob 58 that is threadably disposed in a slot 60 that engages the connecting members 52/54 to fix them relative to each other. In the embodiment shown in the figures, the first connecting member 52 slides into and out of the second connecting member 54. As will be readily appreciated by persons skilled in the art, a variety of different shapes/sizes of connecting members 52/54 and different configurations of connecting mechanism 56 can be utilized to adjustably (whether slidably or not) connect the two control assemblies 43a/43b together. In the embodiments of FIGS. 15-18 and FIGS. 23-26, the control assemblies 43a and 43b are not joined together (forming, in effect, two separate game controllers 10), but are utilized together on a single electronic device 10 to play a video game 14.

As stated above, each control assembly 43a/43b has a device securing mechanism 44 that is structured and arranged to securely hold an electronic device 12 in a manner that allows the user 22 to view the touch screen display 16 as he or she comfortably plays a video game 14. The device securing mechanism 44 comprises an upper body 62 and a lower body 64 that are cooperatively sized and configured to define a device receiving area 66 in which an electronic device 12 is received and to securely hold the electronic device therein during use of the game controller 10 of the present invention. The device securing mechanism 44 is structured and arranged such that the upper body 62 and lower body 64 can be spread apart to an open position 68, best shown in FIGS. 6 and 9, which allows the user 22 to place the electronic device 12 into the device receiving area 66 or remove the electronic device 12 from the device receiving area 66, and so the upper body 62 and lower body 64 can move towards each other to a clamping position 70, best shown in FIGS. 2-5, 15-16, 19, 21, 23-24 and 27, that securely clamps the electronic device 12 in the device receiving area 66. As will be readily appreciated by persons skilled in the art, a variety of devices can be utilized to allow the user 22 to easily move the device securing mechanism 44 between its open position 68 and clamping position 70. For instance, the device securing mechanism 44 can comprise a variety of mechanical devices that allow the user 22 to disengage the mechanical device to place device securing mechanism 44 in the open position 68 and to engage the mechanical device to place the device securing mechanism 44 in its clamping position 70. These mechanical devices include threaded mechanisms (such as screws, bolts and the like), detent devices, devices which are squeezed and then released, and the like. The use and operation of such mechanical devices are generally well known in the art.

For purposes of describing the present invention, the terms "upper", "up", "upward" or the like and the terms "lower", "down", "downward" and the like are utilized to refer to a direction that corresponds to the position the electronic device 12 is being held when it is being utilized to play a video game 14 in a typical up/down position in front of the user 22, such as shown in FIGS. 2-5. In these figures, the first side 34 is the "upper" side and in contact with a portion of the upper body 62 and the second side 36 is the "lower" side and in contact with a portion of the lower body 64.

In the embodiments shown in the drawings, the device securing mechanism 44 comprises a biasing mechanism 72, as best shown in FIGS. 9-12, interconnecting the upper body 62 and the lower body 64 that, in a preferred configuration, is configured to bias the upper body 62 and the lower body 64 towards each other to place the securing mechanism in its clamping position 70. The biasing mechanism 72 should be selected so as to have sufficient biasing force, shown as "BF" in FIG. 3, to securely clamp the upper body 62 against the first side 34 of electronic device 12 and the lower body 64 against the second side 36 of the electronic device 12 to securely hold the electronic device 12 in the device receiving area 66 of the device securing mechanism 44 when the user 22 is playing the video game 14 or otherwise wanting to hold the electronic device 12 by the game controller 10. To position the electronic device 12 into or to remove the electronic device 12 from the device receiving area 66, the user 22 spreads the upper body 62 and the lower body 64 apart by overcoming the biasing force BF of the biasing mechanism 72. As such, the biasing mechanism 72 should not have so much biasing force BF that the user 22 cannot overcome the biasing force BF to move the electronic device 12 in and out of the device receiving area 66. The configuration and use of a biasing mechanism 72 in the manner described above is generally well known to persons who are skilled in the relevant arts.

Figure 9:
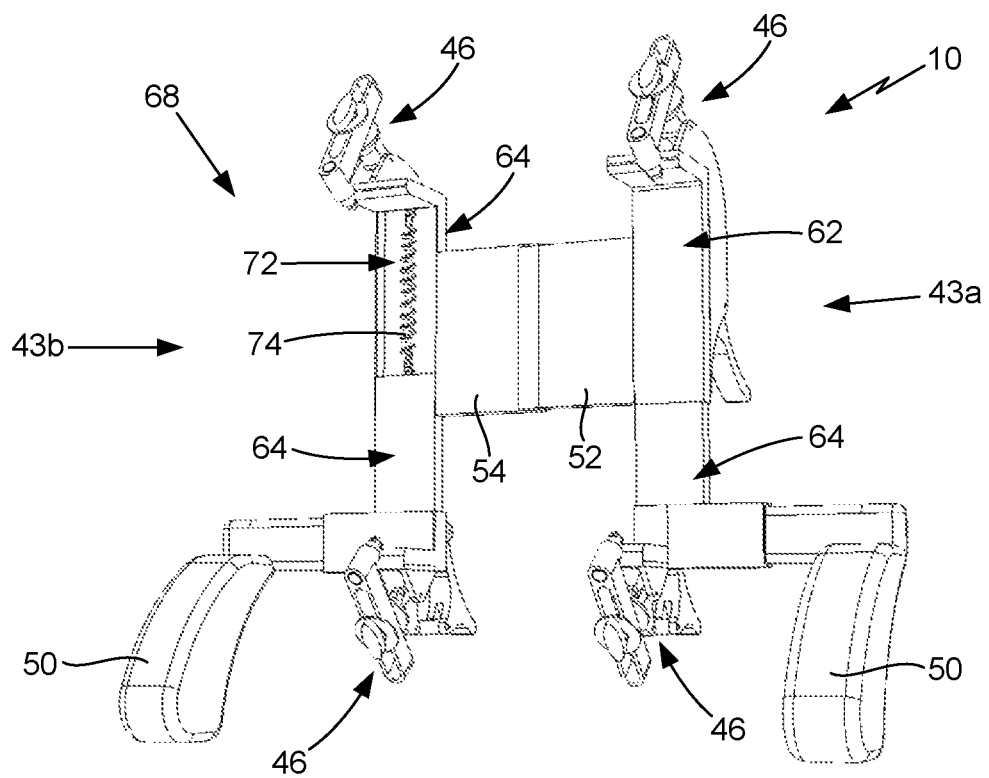
FIG. 9 is a front perspective view of the game controller of FIG. 6 with a wall of the upper body removed to show use of a spring as a biasing mechanism to secure an electronic device in the game controller.
Figure 10:
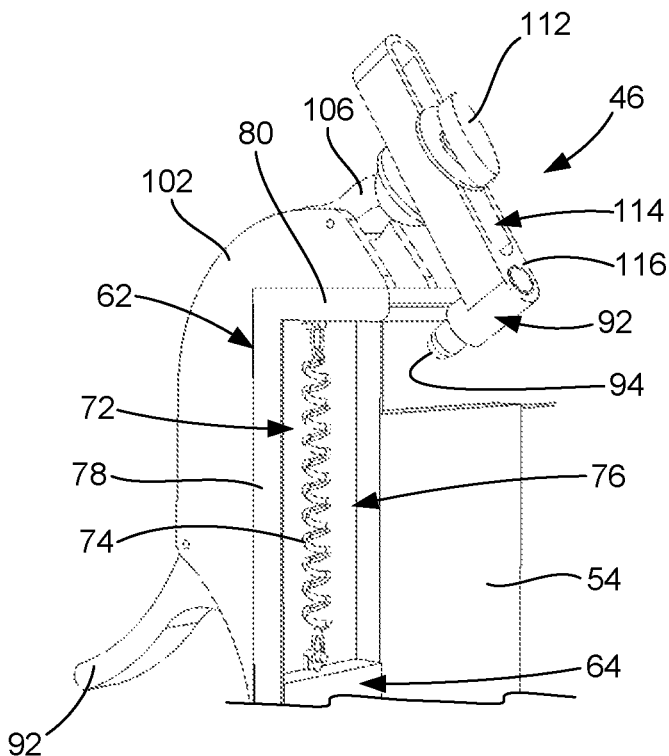
FIG. 10 is an isolated front perspective view of the game controller of FIG. 9 particularly showing the biasing mechanism and spring.
Figure 11:
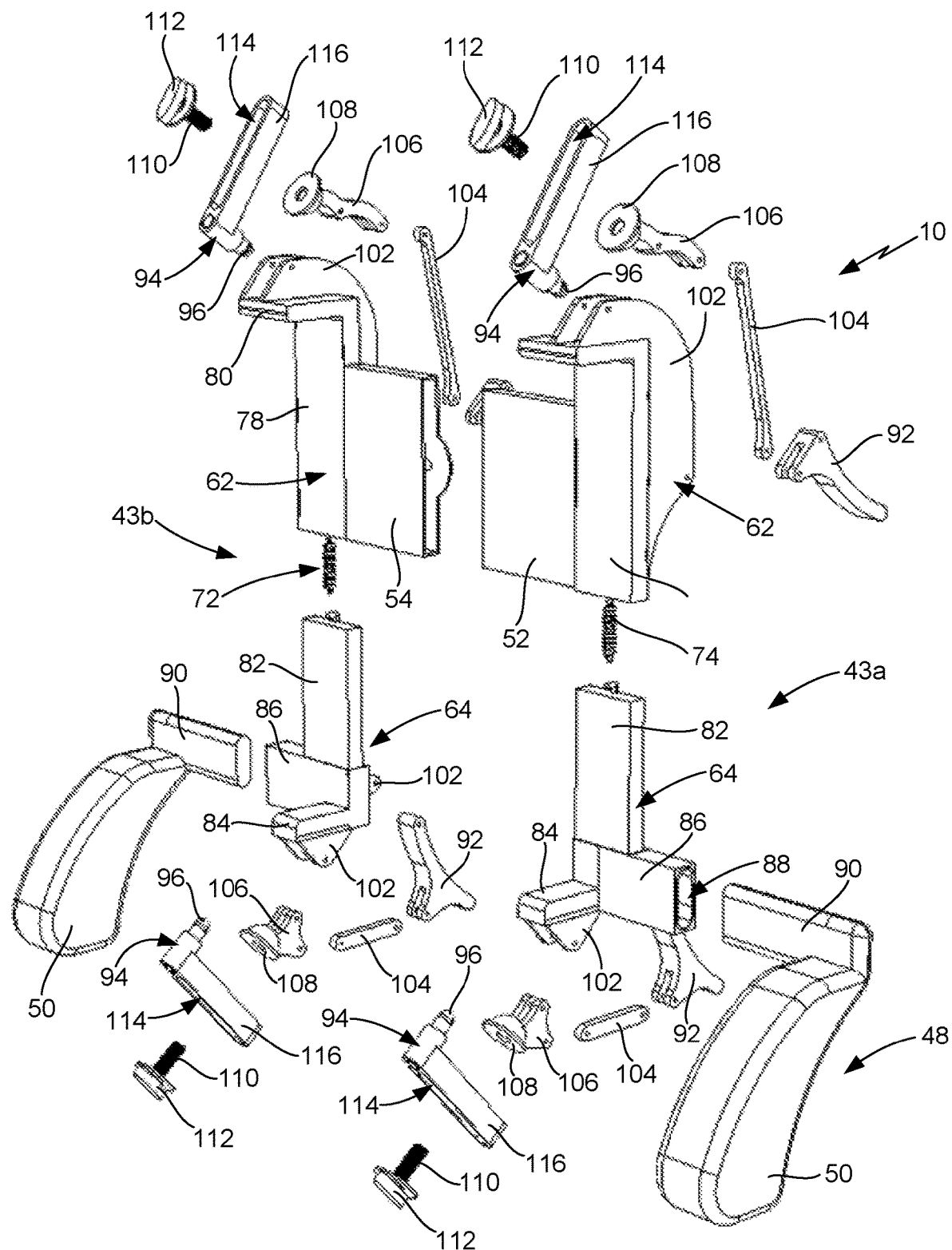
FIG. 11 is an exploded front perspective view of the game controller of FIG. 6.
Figure 12:
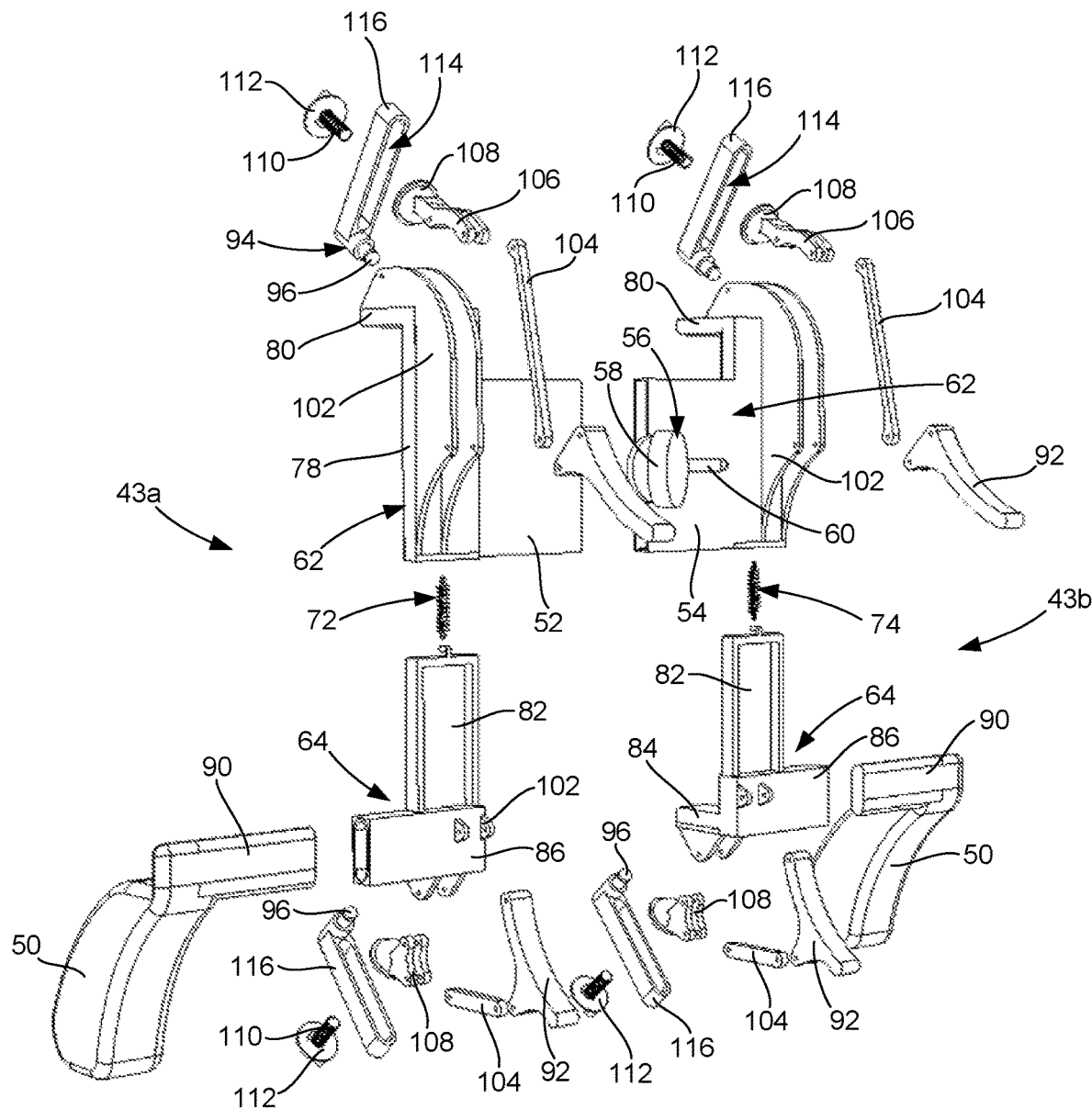
FIG. 12 is an exploded back perspective view of the game controller of FIG. 9.

In a preferred configuration of the game controller 10 of the present invention, the biasing mechanism 72 of the device securing mechanism 44 is a spring 74 that interconnects the upper body 62 and lower body 64, as best shown in FIGS. 9-12. As shown in FIGS. 9 and 10 (which has a portion of the upper body 62 removed to illustrate the features of the biasing mechanism 72) the upper body 62 and the lower body 64 are telescopically configured, with the upper body 62 having a biasing chamber 76 in which the spring 74 is located. The spring 74 interconnects the upper body 62 and the lower body 64 inside the biasing chamber 76 such that the lower body 64 will move, relative to the upper body 62, generally in an upward and downward direction inside the biasing chamber 76. As set forth above, movement of the lower body 64 relative to the upper body 62 results from either the biasing force BF (upward movement) from the spring 74 or the spreading force (downward movement) applied by the user 22 to place the electronic device 12 into or remove it from the device receiving area 66. As best shown in FIG. 10, the spring 74 can be attached to the upper end of the upper body 62 and the upper end of the lower body 64.

To secure the electronic device 12 inside the device securing area 66, the upper body 62 and the lower body 64 of the device securing mechanism 44 comprise components that enable the game controller 10 to securely hold onto the electronic device 10. In the embodiments shown in the figures, the upper body 62 has a hollow support member 78 that defines and encloses the biasing chamber 76 (except for the open lower end thereof in which the lower body 64 is received) and an inwardly extending upper lip member 80 that is attached to or integral with the upper end of the support member 78 so as to extend into the device receiving area 66 so it will abut against the first side 34 of the electronic device 12, as best shown in FIGS. 2, 3, 5-8 and 10-12, when the game controller 10 is utilized with electronic device 12. The lower body 64 has a support member 82 sized and configured to move upward and downward in the biasing chamber 76 and an inwardly extending lower lip member 84 that is attached to or integral with the lower end of the support member 82 so as to extend into the device receiving area 66 to abut against the second side 34 of the electronic device 12, as shown in FIGS. 2, 6-8 and 11-12, when game controller 10 is utilized with electronic device 12.

In the embodiment of the game controller 10 of FIGS. 2-12, having the two joined control assemblies 43*a*/43*b*, the lower body 64 also has a transversely disposed handle receiving member 86 that, in the embodiment shown, has an interior chamber 88 which is sized and configured to receive and engage a transversely disposed handle support member 90, which is attached to or integral with the handle 50, as best shown in FIGS. 6, 9 and 11-12. As shown in the figures, when the handle support member 90 is inside the interior chamber 88 of the handle receiving member 86, the handles 50 extend towards the user 22 so he or she can use their hands 26 to grasp the handles 50, thereby positioning the touch screen display 16 of the electronic device 12 directly in front of him or her so he or she can play the video game 14 on the electronic device 12. In the preferred configuration, the handle receiving members 86 and handle support members 90 are cooperatively configured to allow the user 22 to adjust the distance between the two handles 50, as may be necessary or beneficial for the comfort of the user 22, and to prevent the handles 50 twisting relative to the control assemblies 43*a*/43*b*.

The distance between the handles 50 can be adjusted by allowing the handle support members 90 (and, therefore, the handles 50) to move inward and outward in the internal chamber 88. Twisting of the handles 50 can be prevented by having the support members 90 be cooperatively shaped with the internal chamber 88 so as to prevent the support members 90 from pivoting (twisting) relative to the handle receiving member 86. To prevent potential damage to the game controller 10 and/or the electronic device 12 from the handles 50 becoming disconnected, the handle support member 90 should securely engage the handle receiving member 86 and a mechanism be provided to prevent the handle support member from being pulled completely out of the internal chamber 88. In one embodiment, the handle support member 90 can be cooperatively sized and configured with the handle receiving member 86 to frictionally engage the interior chamber 88 thereof. In other embodiments, a wide variety of mechanical connectors, including screws, bolts, pins, rods and the like, can be utilized to securely attach (with or without the interior chamber 88) the handle 50 to the handle receiving member 86. In another embodiment, the handle 50 is integrally formed with lower body 64 of the device securing mechanism 46. In some configurations, this would eliminate the adjustability of the distance between the handles 50. In other embodiments, the adjustability could be provided by allowing the connecting members 52/54 to move relative to each other and, therefore, move the handles 50 closer together or further apart. In any embodiment, the handles 50 must sufficiently engage, attach or be integral with the lower body 64 to allow the user 22 to move freely with the game controller 10 as he or she is playing a video game 14 with the hand-held electronic device 12.

Figure 7:
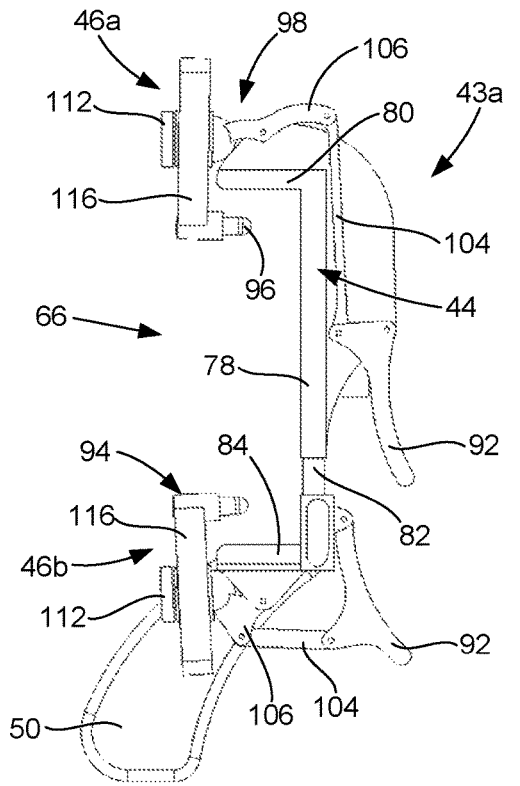
FIG. 7 is a right side view of the game controller of FIG. 6.
Figure 8:
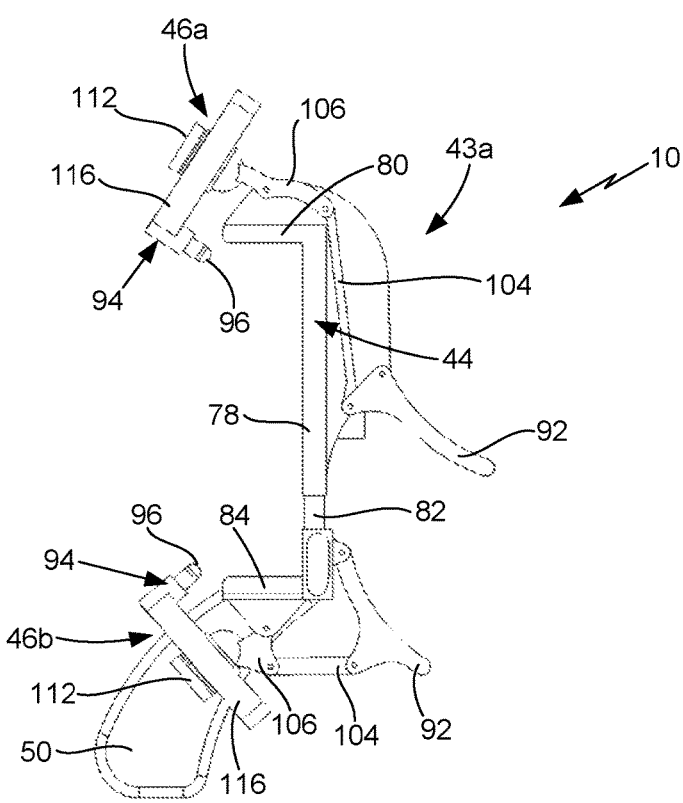
FIG. 8 is a right side view of the game controller of FIG. 7 shown with the control assemblies in their disengaged positions.

As set forth above, the screen engaging mechanism 46 is structured and arranged to be operated by the user 22 to contact the touch screen display 16 of the electronic device 12 at the control points 42 in a manner that operates or controls various aspects of the video game 14, including as applicable a game object 40. As will be readily appreciated by persons skilled in the art, particularly for shooter type of video games 14, the screen engaging mechanism 46 must be configured to rapidly and repeatedly touch one or more of the control points 42 for the user 22 to be able to effectively and enjoyably play the video game 14. The screen engaging mechanisms 46 described herein accomplishes this objective in a manner that does not require any batteries, electronic connections or the like. As set forth below, the game controller 10 can have a plurality of control assemblies 43*a*/43*b*, each with one or more screen engaging devices 46. Some embodiments of the new game controller 10 have a control assembly 43 that comprises an upper screen engaging device 46*a* and a lower screen engaging device 46*b*, as best shown in FIGS. 7 and 8.

The screen engaging devices 46 of the present invention comprise a trigger 92 that is mechanically connected to a capacitive stylus 94 (which has a capacitive tip 96), as best shown in FIGS. 6-12, 16, 18, 21-22 and 24-26, such that when the user 22 engages the trigger 92 with one of his or her fingers 24, the capacitive tip 96 of the capacitive stylus 94 will be directed against the touch screen display 16 at one of the control points 42, as shown in FIG. 2, to place the screen engaging device 46 in an engaged position 98. When the user 22 releases the trigger 92, the mechanical connection will pivot the capacitive stylus 94 to move the capacitive tip 96 thereof away from the touch screen display 16, thereby placing the screen engaging device 46 in a disengaged position 100. As will be readily appreciated by persons skilled in the art, in order for a mechanical device or object to operatively engage a touch screen display 14 of electronic device 12, the device or object must have a capacitive tip 96 to engage capacitive touch screens that are utilized in hand-held electronic devices 12 as the touch screen display 16. The capacitive tip 96 of a capacitive stylus 94 allows the touch screen display 16 to distinguish and sense specific touch locations that would otherwise be based on the electrical impulses in a human body (i.e., normally through the fingertip of fingers 24). Capacitive touch screens do not require any significant force to be applied to the useable screen area 18 of the touch screen display 16. As well known in the art, a capacitive stylus 94 has the tip 96 thereof selected and/or configured to provide the capacitive touch necessary to operate the touch screen display 16 of an electronic device 12.

In a preferred embodiment of the game controller 10 of the present invention, each of the screen engaging mechanisms 46 are similarly configured. For purposes of describing the present invention, reference is made to the upper screen engaging mechanism 46a of the first control assembly 43a. As best shown in FIGS. 7-8 and 11-12, the trigger 92 is pivotally attached to a mounting member 102 that is attached to or integral with the upper body 62 of the device securing mechanism 44 so as to pivot relative to the upper body 62 when the user 22 engages the trigger 92 with one of his or her fingers 24. The trigger 92 is also attached, typically pivotally, to a lower end of a stiff connecting rod 104. The upper end of the connecting rod 104 is attached to a connecting arm 106 having a mounting surface 108 thereon. The mounting surface 108 is configured to receive the threaded mounting member 110 of an adjusting mechanism 112, with the mounting member 110 extending through a slot 114 in a support/sliding arm 116 that supports the capacitive stylus 94 at one end thereof. Pins (not shown) are utilized to connect the trigger 92 to the mounting member 102, the trigger 92 to the connecting rod 104, the connecting rod 104 to the connecting arm 106 and the connecting arm 106 to the mounting member 102. The aperture in the mounting surface 108 of the connecting arm 106 is threaded to threadably receive the mounting member 110 of the adjusting mechanism 112, which be a knob or like device that is easy for the user 22 to rotate to loosen the adjusting mechanism 112 from the mounting surface 108. When tightened into the mounting surface 108, the adjusting mechanism 112 secures the support arm 116 in a desired position to place the tip 96 of the stylus 94 at the location of a control point 42. The user 22 loosens the adjusting mechanism 112 to allow the support arm 116 to slide in and out and rotate left and right, via the slot 114 through which the mounting member 110 extends, to allow the user 22 to position the capacitive tip 96 at a control point 42, which are likely to vary for different video games 14. The screen engaging mechanism 46 is configured such that the default position (i.e., when the user 22 is not engaging the trigger 92) is the disengaged position 100. In this manner, the capacitive tip 96 only contacts the touch screen display 16 at the control point 42 when the user 22 squeezes or otherwise engages the trigger 92. When the user 22 engages the trigger 92, the trigger 92 will pivot to push the connecting rod 104 up and pivot the connecting arm 106 so the support arm 116 will drive the capacitive tip 96 of the capacitive stylus 94 against the touch screen display 16. In use, the user 22 will be able to rapidly squeeze the trigger 92 with his or her finger 24 to make rapid, repeated contact against one of the control points 42 to control the video game 14 and/or affect one of the game objects 40 thereof.

With regard to the lower screen engaging mechanism 46b of the first control assembly 43a, the trigger 92 is pivotally attached to a mounting member 102 that is attached to or integral with the lower body 64 of the device securing mechanism 44 so as to pivot relative to the lower body 64 when the user 22 engages the trigger 92 with one of his or her fingers 24. The trigger 92 is also attached, typically pivotally, to the rearward end (away from the device receiving area 66) of a stiff connecting rod 104. The inward end of the connecting rod 104 is attached to a connecting arm 106 having a mounting surface 108 thereon. The mounting surface 108 is configured to receive the threaded mounting member 110 of an adjusting mechanism 112, with the mounting member 110 extending through a slot 114 in a support arm 116 that supports the capacitive stylus 94 at one end thereof. Pins (not shown) are utilized to connect the trigger 92 to a mounting member 102, the trigger 92 to the connecting rod 104, the connecting rod 104 to the connecting arm 106 and the connecting arm 106 to a second mounting member 102. The aperture in the mounting surface 108 of the connecting arm 106 is threaded to threadably receive the mounting member 110 of the adjusting mechanism 112, which may be a knob or like device that is easy for the user 22 to rotate to loosen the adjusting mechanism 112 from the mounting surface 108. As described above, when tightened into the mounting surface 108, the adjusting mechanism 112 secures the support arm 116 in a desired position to place the tip 96 of the stylus 94 at the location of a control point 42. The user 22 loosens the adjusting mechanism 112 to allow the support arm 116 to slide in and out and rotate left and right, via the slot 114 through which the mounting member 110 extends, to allow the user 22 to position the capacitive tip 96 at a control point 42, which are likely to vary for different video games 14. The screen engaging mechanism 46 is configured such that the default position (i.e., when the user 22 not engaging the trigger 92) is the disengaged position 100. In this manner, the capacitive tip 96 only contacts the touch screen display 16 at the control point 42 when the user 22 squeezes or otherwise engages the trigger 92. When the user 22 engages the trigger 92, the trigger 92 will pivot to push the connecting rod 104 inward and pivot the connecting arm 106 so the support arm 116 will drive the capacitive tip 96 of the capacitive stylus 94 against the touch screen display 16. As with the upper screen engaging mechanism 46a, when using the lower screen engaging mechanism 46b the user 22 will be able to rapidly squeeze the trigger 92 with his or her finger 24 to make rapid, repeated contact against one of the control points 42 to control the video game 14 and/or affect one of the game objects 40 thereof.

Figure 13:
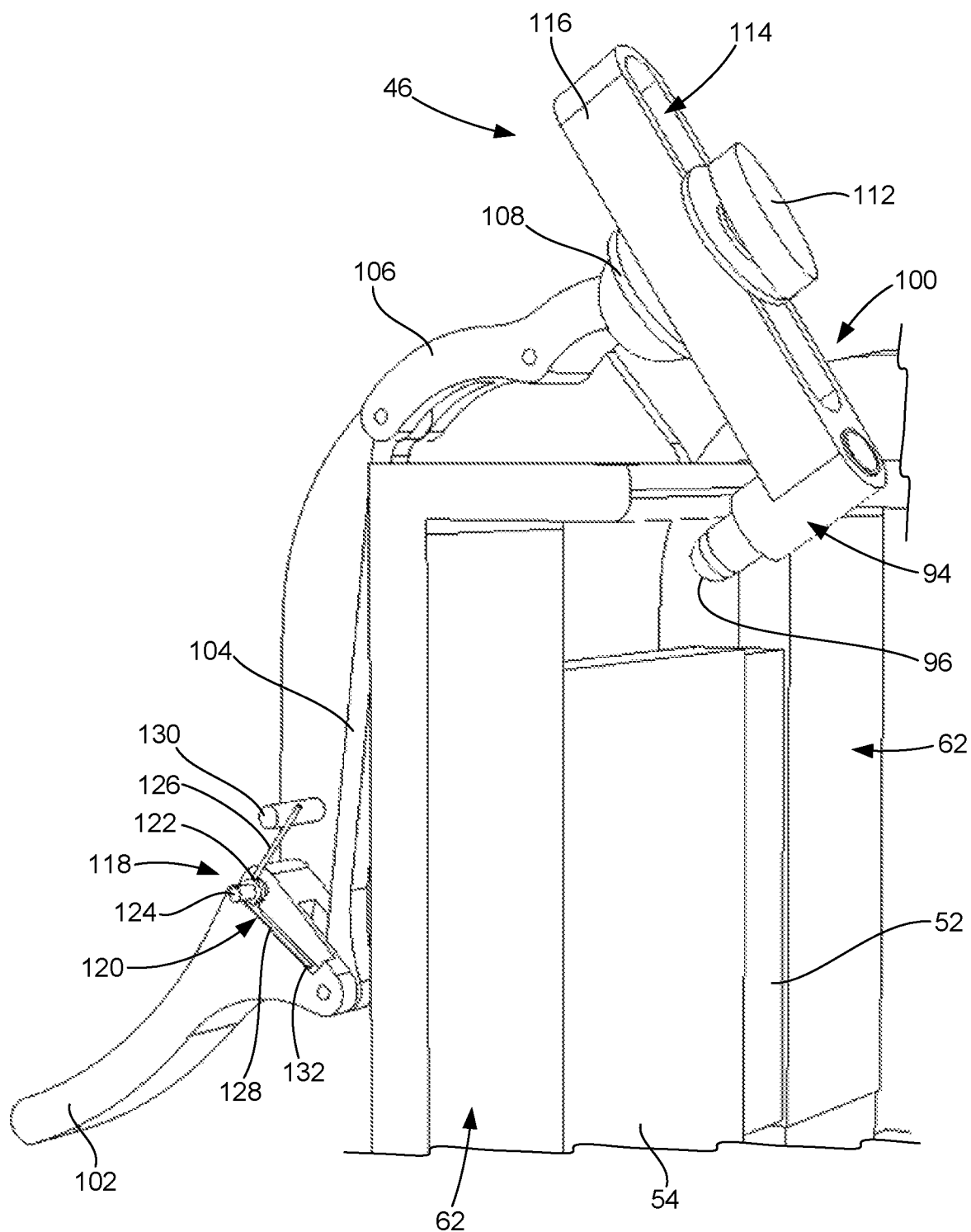
FIG. 13 is an isolated front perspective view of an alternative configuration of the game controller of FIG. 6 showing the first control assembly utilizing a spring.
Figure 14:
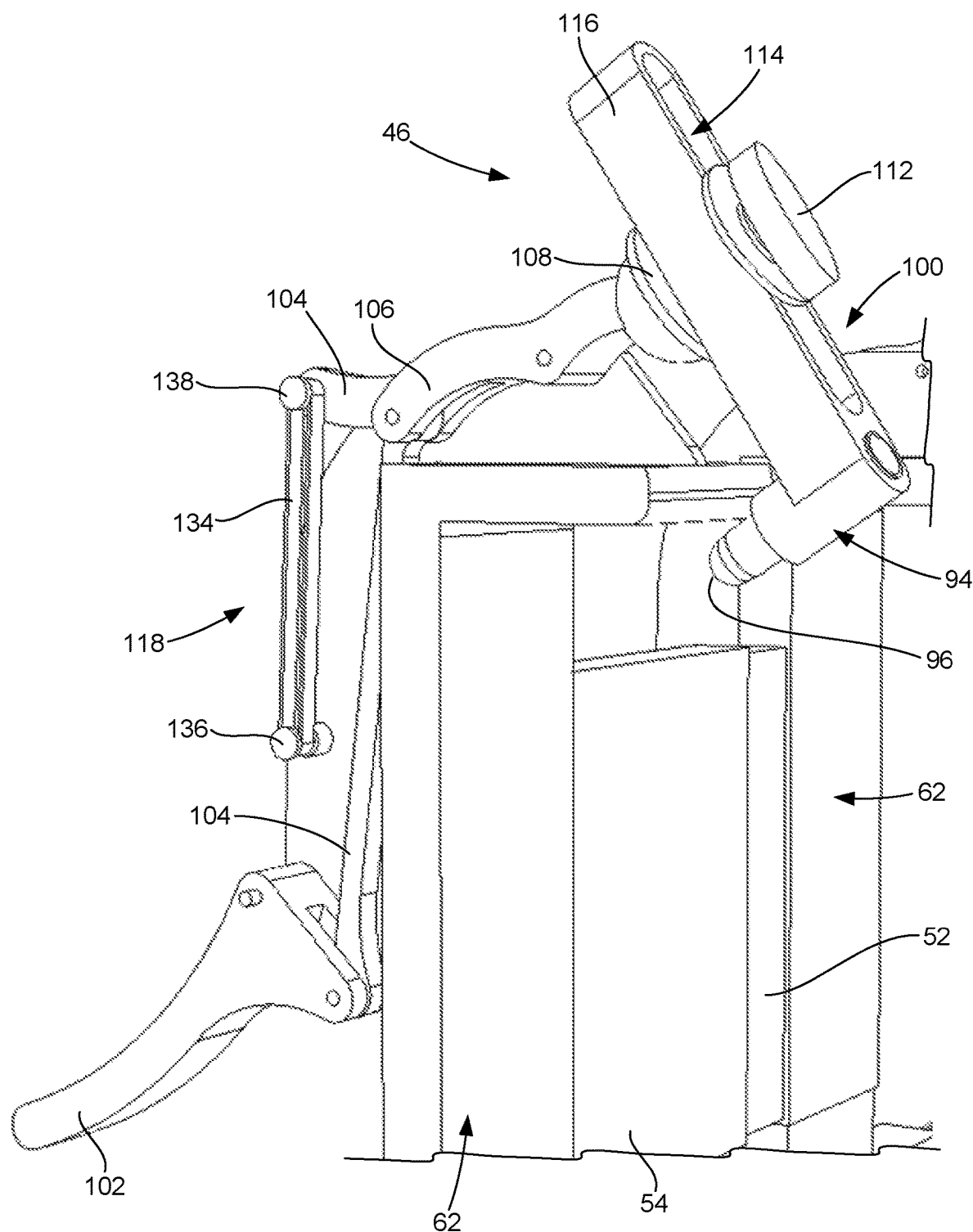
FIG. 14 is an isolated front perspective view of an alternative configuration of the game controller of FIG. 6 showing the first control assembly utilizing a rubber band.

To prevent the capacitive tip 96 from contacting the touch screen display 16 when the user 22 has not squeezed or otherwise engaged the trigger 92, the preferred embodiment of the present invention has a trigger tensioning mechanism 118 that is configured to apply a biasing force to the trigger 92, directly or indirectly, that will keep the capacitive tip 96 in spaced apart relation to the touch screen display 16 (i.e., keep the screen engaging mechanism 46 in the disengaged position 100). Examples of trigger tensioning mechanisms 118 that can be utilized with the game controller 10 of the present invention are shown in FIGS. 13 and 14. In the embodiment of FIG. 13, the trigger tensioning mechanism 118 comprises a torsion spring 120. As shown in FIG. 13, in one configuration the coil portion 122 of the torsion spring 120 is positioned around a spring post 124 with the first leg 126 and second leg 128 thereof extending outward so the first leg 126 of the torsion spring 120 will be biased against a biasing post 130 positioned on the connecting rod 104 and the second leg 128 will be biased against a cut-out section 132 of the trigger 92. The torsion spring 120 should be selected so as to bias the trigger 92 in a manner that will pull the connecting rod 104 downward and, therefore, pull the capacitive tip 96 of the capacitive stylus 94 away from the touch screen display 16 (i.e., the disengaged position 100) when the electronic device 12 is in the device receiving area 66. In use, the user 22 presses against the trigger 92 with sufficient force to overcome the biasing force of the torsion spring 120, which will push the connecting rod 104 upward and drive the capacitive tip 96 against the touch screen display 16 to contact one of the control points 42 of the video game 14.

In the embodiment of FIG. 14, the trigger tensioning mechanism 118 comprises an elastic member 134, such as a rubber band or the like, that is stretched between a first support post 136 associated with the upper body 62 and a second support post 138 associated with the connecting arm 106 to provide tension to the connecting arm 106 to push the end of the connecting arm 106 that connects to the connecting rod 104 generally upward and, as a result, keep the capacitive tip 96 in spaced apart relation to the touch screen display 16 (i.e., the disengaged position 100 for screen engaging mechanism 46) of an electronic device 12 with which the game controller 10 is being utilized. In the embodiment of FIG. 14, the second support post 138 is mounted on a tension arm 140 that connects to the junction of the connecting rod 104 and connecting arm 106. The elastic member 134 should be selected so as to have sufficient tensile strength to provide a biasing force that will maintain the capacitive tip 96 in spaced apart relation to the touch screen display 16 (i.e., screen engaging mechanism 46 in its disengaged position 100) until the user 22 applies sufficient force to the trigger 92 to overcome the tensile strength of the elastic member 134. In use, the user 22 presses against the trigger 92 with sufficient force to overcome the biasing force of the elastic member 134, which will push the connecting rod 104 upward and drive the capacitive tip 96 against the touch screen display 16 to contact one of the control points 42 of the video game 14.

As will be readily appreciated by persons who are skilled in the relevant arts, a wide variety of devices may be utilized for the trigger tensioning mechanism 118. For instance, the trigger tensioning mechanism 118 can be incorporated into the structure of the trigger 92 itself and/or incorporated into the connecting rod 104, connecting arm 106 or support arm 116 to maintain the capacitive tip 96 in spaced apart relation to the touch screen display 16 and the screen engaging mechanism 46 in its disengaged position 100. Any such trigger tensioning mechanism 118 should be configured to maintain the disengaged position 100 until the user 22 applies force to the trigger 92 when he or she desires the capacitive tip 96 to contact the touch screen display 16 at a control point 42 to affect the video game 14 in the desired manner (i.e., shoot a weapon). As such, the trigger tensioning mechanisms 118 that are described above are provided for exemplary purposes only and, except as set forth in the claims, are not intended to limit the scope of the present invention.

Figure 15:
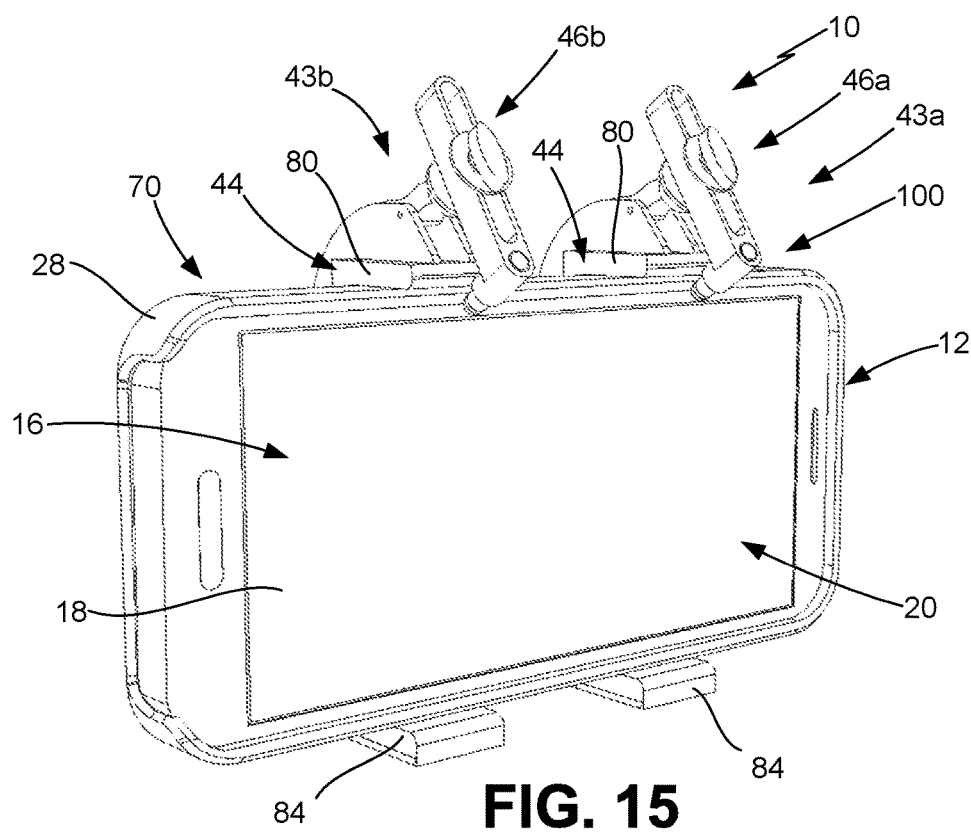
FIG. 15 is a front perspective view of a pair of game controllers for hand-held electronic devices that are each configured according to a second embodiment of the present invention, with the game controllers shown in use with the hand-held electronic device of FIG. 1 and each of the control assemblies of the game controllers in their disengaged positions.
Figure 16:
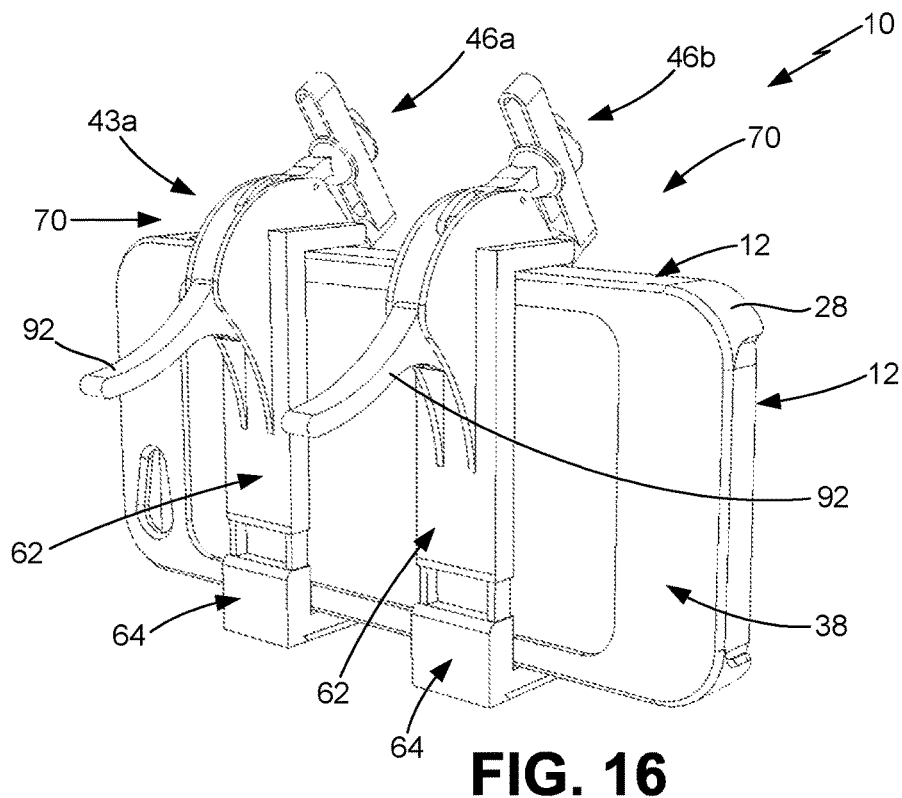
FIG. 16 is a back perspective view of the game controllers and the electronic device of FIG. 15.
Figure 17:
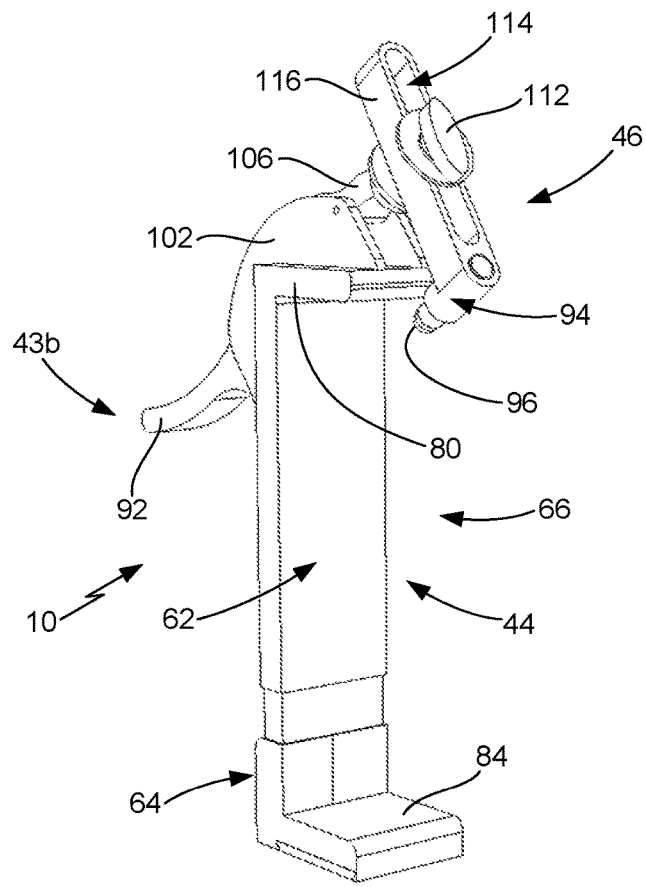
FIG. 17 is a front perspective view of the first game controller of FIG. 15.
Figure 18:
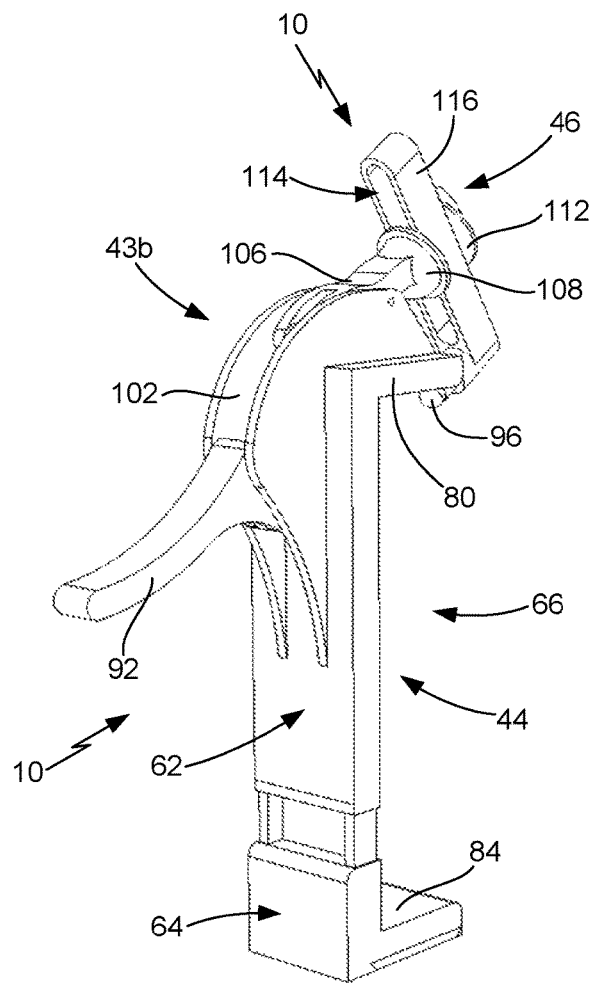
FIG. 18 is a back perspective view of the first game controller of FIG. 17.

The embodiment of the game controller 10 of the present invention of FIGS. 15-18 shows use of two separate (i.e., non-attached) control assemblies 43a/43b, no lower screen engaging mechanisms 44 and no handles 50. In this embodiment, as with the above described embodiment, each control assembly 43a/43b has a device securing mechanism 44 that is structured and arranged to securely hold the electronic device 12 in the device receiving area 66 and a screen engaging mechanism 46 that is structured and arranged to rapidly and repeatedly contact the touch screen display 16 at the control points 42. As best shown in FIGS. 16 and 17, the device securing mechanism 44 comprises the lower body 64 being telescopically received in the upper body 62, with the upper body 62 and lower body 64 connected by a biasing mechanism 72 that securely clamps the electronic device 12 between the upper lip member 80 and lower lip member 84, as best shown in FIG. 15. The screen engaging mechanisms 46, which are in their disengaged position 100, comprise the trigger 92 mechanically connected to the capacitive stylus 94 via the mounting member 102, connecting rod 104 (not shown), connecting arm 106, mounting surface 108, support arm 116 and adjusting mechanism 112, as best shown in FIGS. 16 and 17, to rapidly and repeatedly drive the capacitive tip 96 against a control point 42 when the user 22 applies pressure to the trigger 92. As best shown in the back perspective view of FIG. 16, the user 22 utilizes the game controller 10 of the embodiment of FIGS. 15-18 by holding the electronic device 12 in the user's hand 26 so his or her fingers 24 can operate the two triggers 92 to drive the capacitive tip 96 against the control points 42 at or near the first side 34 of the electronic device 12 to affect the game object 40 as he or she plays the video game 14. Other control points 42, if any, can be operated by the user 22 using one or more of his or her fingers 24.

Figure 19:
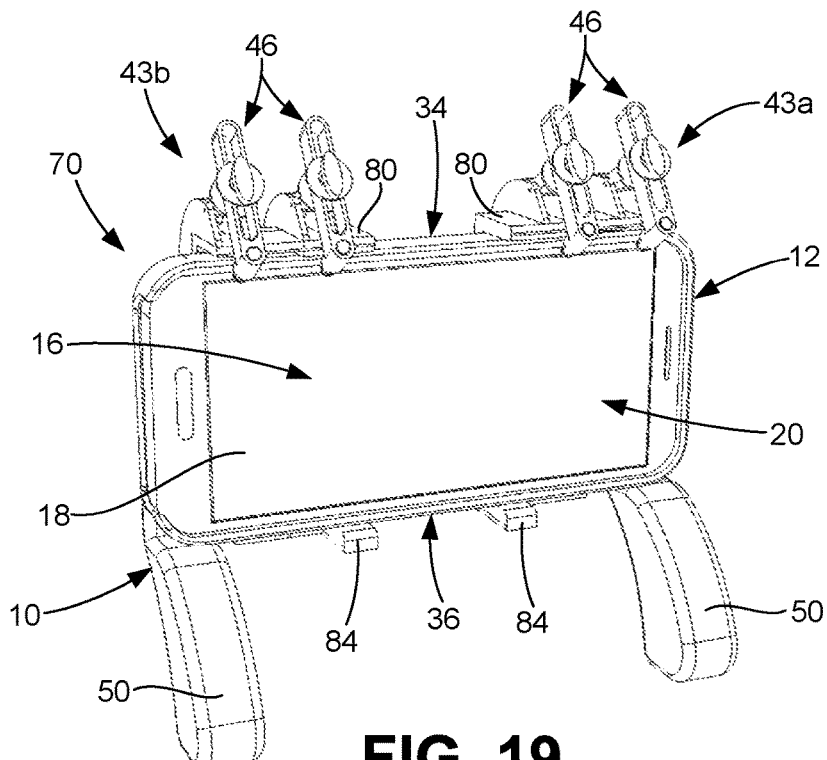
FIG. 19 is a front perspective view of a game controller for hand-held electronic devices that is configured according to a third embodiment of the present invention shown in use with the hand-held electronic device of FIG. 1 with each of the control assemblies in their disengaged positions.
Figure 20:
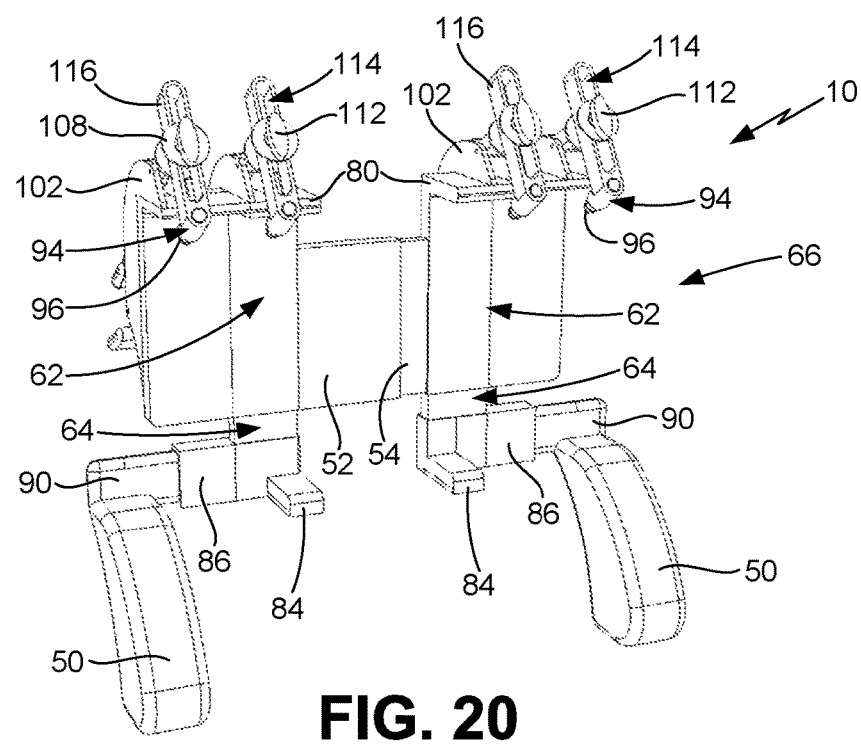
FIG. 20 is a front perspective view of the game controller of FIG. 19 shown without the electronic device.
Figure 21:
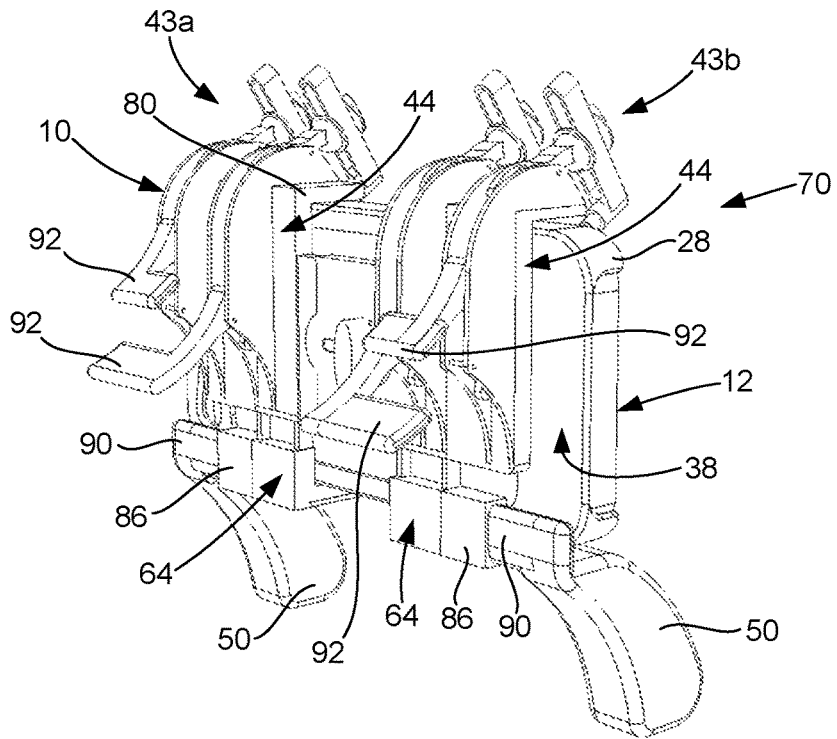
FIG. 21 is a back perspective view of the game controller of FIG. 19.
Figure 22:
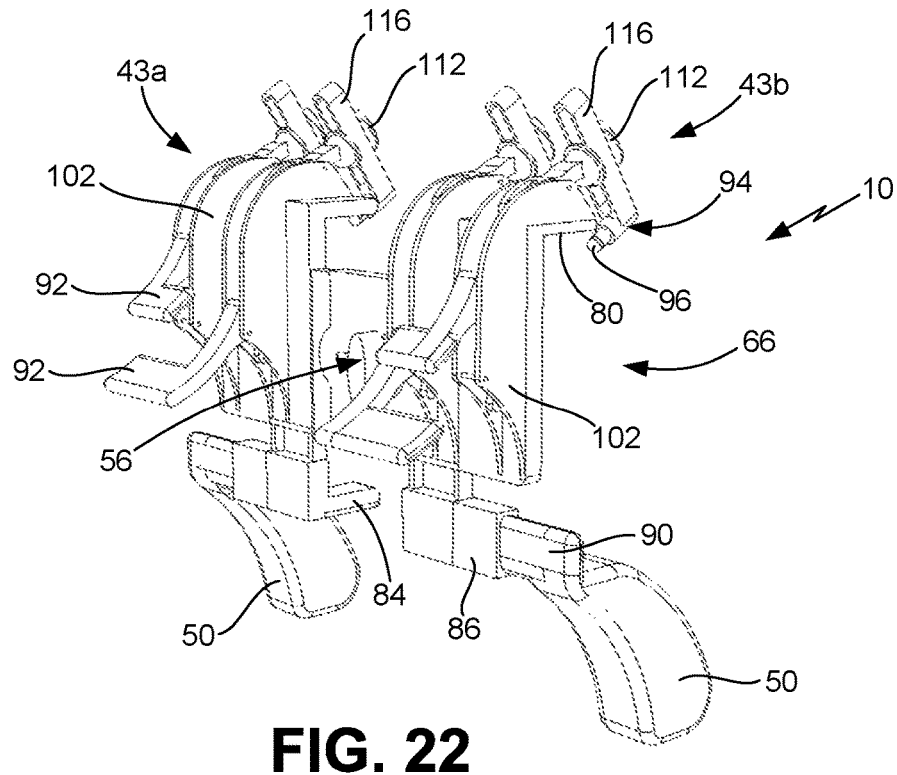
FIG. 22 is a back perspective view of the game controller of FIG. 21 shown without the electronic device.

The embodiment of FIGS. 19-22 show a game controller 10 that is configured according to the present invention that has handles 50, a pair of left and right control assemblies 43a/43b that are joined together to form a single unit, and no lower screen engaging mechanisms 46. In this embodiment, as with the above described embodiments, each control assembly 43a/43b has a device securing mechanism 44 that is structured and arranged to securely hold the electronic device 12 in the device receiving area 66 and a screen engaging mechanism 46 that is structured and arranged to rapidly and repeatedly contact the touch screen display 16 at the control points 42 (four control points 42 at or near the first side 34 of the electronic device 12). As best shown in FIGS. 20 and 21, device securing mechanism 44 comprises the lower body 64 being telescopically received in the upper body 62, with the upper body 62 and lower body 64 connected by a biasing mechanism 72 to clamp the electronic device 12 between upper lip member 80 and lower lip member 84, as best shown in FIG. 19. Though not specifically labeled in these figures, the screen engaging mechanisms 46, which are in their disengaged position 100, comprise the trigger 92 mechanically connected to the capacitive stylus 94 via the mounting member 102, connecting rod 104 (not shown), connecting arm 106, mounting surface 108, support arm 116 and adjusting mechanism 112, as best shown in FIGS. 20 and 22, to rapidly and repeatedly drive the capacitive tip 96 against a control point 42 when the user 22 applies pressure to the trigger 92. In this embodiment, as with the embodiment of FIGS. 2-12, the game controller 10 has the control assemblies 43a/43b (which each have two screen engaging mechanisms 46) joined by the connecting members 52/54, as best shown in FIG. 20, and the handles 50 connected to the lower body 64 by the handle support member 90 being received in the internal chamber 88 of the handle receiving member 86. The user 22 will play the video game 14 while holding the game controller 10 with his or her hands 26 and operate the triggers 92 with his or her fingers 24 to drive the capacitive tips 96 against the control points 42 to affect the game object 40 as he or she plays the video game 14. Any control points 42 located at or near the second side 36 or the ends 30/32 can be operated by the user 22 using one or more of his or her other fingers 24 (i.e., thumbs).

Figure 23:
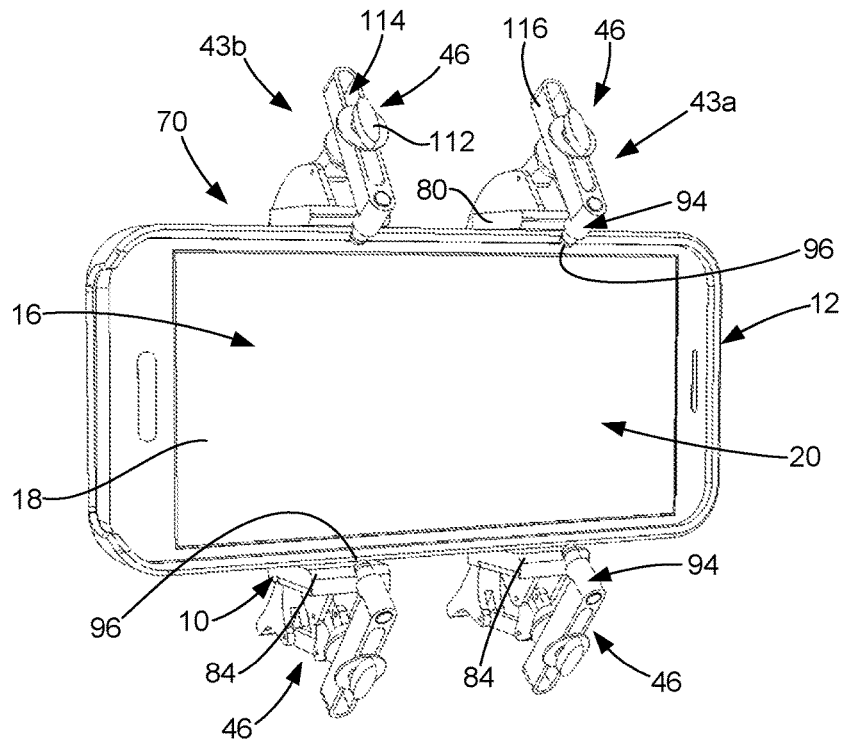
FIG. 23 is a front perspective view of a pair of game controllers for hand-held electronic devices that are each configured according to a fourth embodiment of the present invention, with the game controllers shown in use with the hand-held electronic device of FIG. 1 and each of the control assemblies of the game controllers in their disengaged positions.
Figure 24:
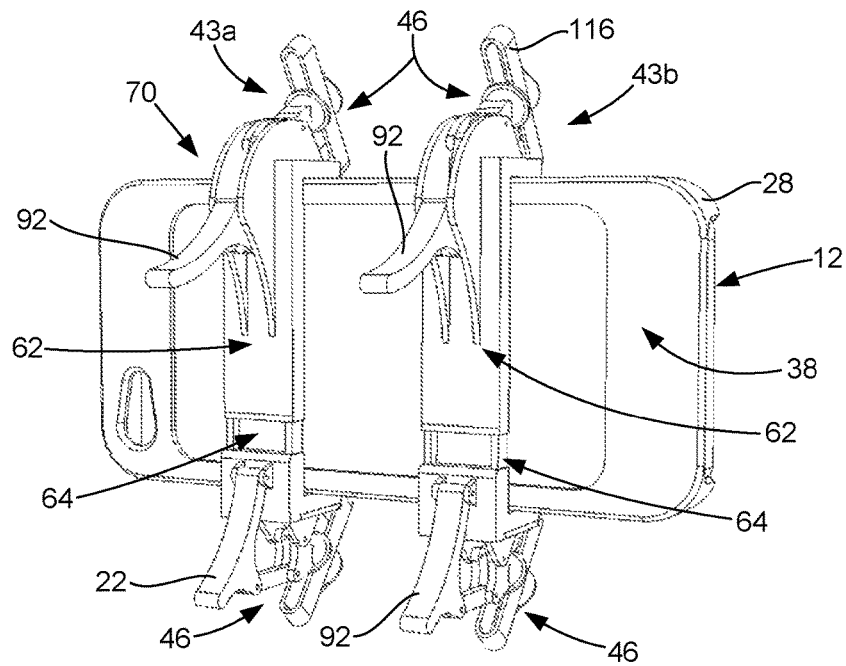
FIG. 24 is a back perspective view of the game controllers and the electronic device of FIG. 23.
Figure 25:
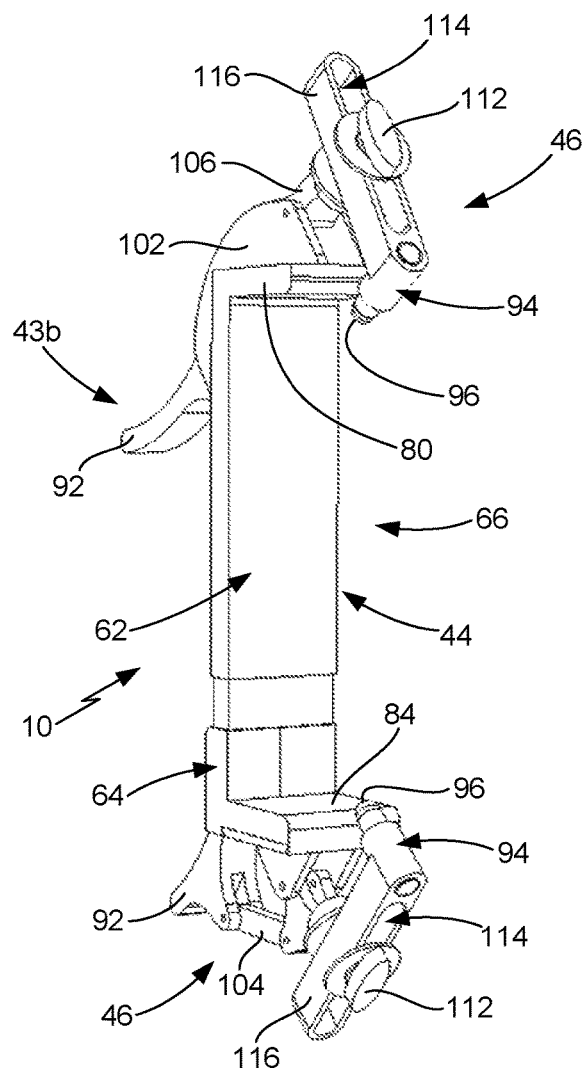
FIG. 25 is a front perspective view of the first game controller of FIG. 23.
Figure 26:
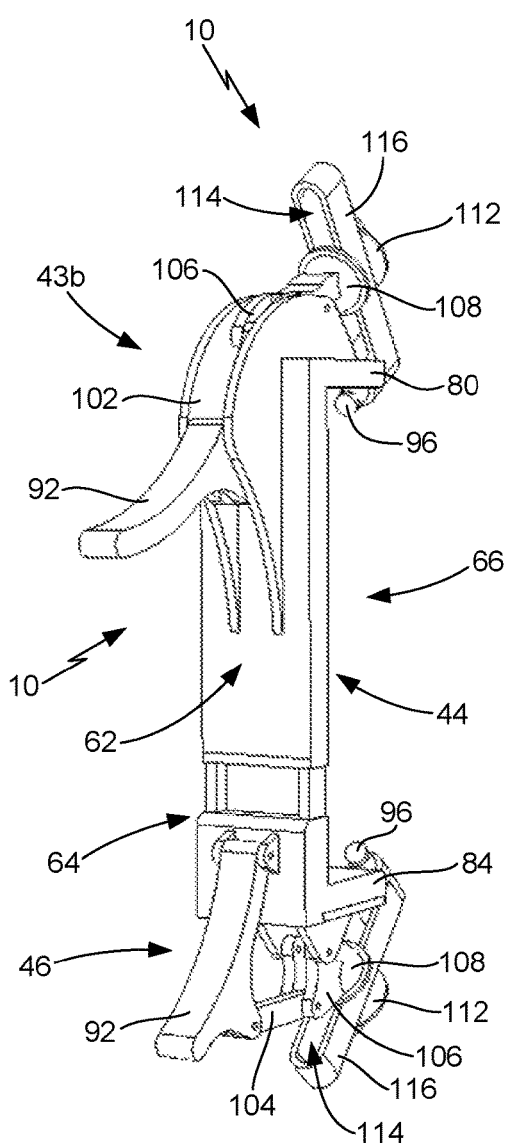
FIG. 26 is a back perspective view of the first game controller of FIG. 25.

FIGS. 23-26 illustrate a fourth embodiment of the game controller 10 of the present invention. In this embodiment, like the second embodiment shown in FIGS. 15-18, the game controller 10 comprises separate control assemblies 43a/43b that are individually slid into position on the electronic device 12 so the capacitive tips 96 will contact the control points 42 when the user 22 operates the respective triggers 92. Like the second embodiment, this embodiment does not utilize the handles 50 or the connecting members 52/54 or connecting mechanism 56. Unlike the second embodiment, this embodiment does utilize lower screen engaging mechanisms 46 that will be positioned so the capacitive tips 96 thereof will contact control points 42 located at or near the second side 36 of the electronic device 12. In this embodiment, as with the above described embodiments, each control assembly 43a/43b has a device securing mechanism 44 that is structured and arranged to securely hold the electronic device 12 in the device receiving area 66 and a screen engaging mechanism 46 that is structured and arranged to rapidly and repeatedly contact the touch screen display 16 at the control points 42. As best shown in FIGS. 25 and 26, the device securing mechanism 44 comprises the lower body 64 being telescopically received in the upper body 62, with the upper body 62 and lower body 64 being connected by a biasing mechanism 72 to clamp the electronic device 12 between the upper lip member 80 and lower lip member 84, as best shown in FIG. 23. The screen engaging mechanisms 46, which are in their disengaged position 100, comprise the trigger 92 mechanically connected to the capacitive stylus 94 via the mounting member 102, connecting rod 104, connecting arm 106, mounting surface 108, support arm 116 and adjusting mechanism 112, as best shown in FIGS. 25 and 26, to rapidly and repeatedly drive the capacitive tip 96 against a control point 42 when the user 22 applies pressure to the trigger 92. As best shown in the back perspective view of FIG. 24, the user 22 utilizes the game controller 10 of the embodiment of FIGS. 23-26 by holding the electronic device 12 the user's hand 26 (as with the second embodiment) so his or her fingers 24 can operate the two triggers 92 to drive the capacitive tip 96 against the control points 42 at or near the first side 34 of the electronic device 12 to affect the game object 40 as he or she plays the video game 14.

Figure 27:
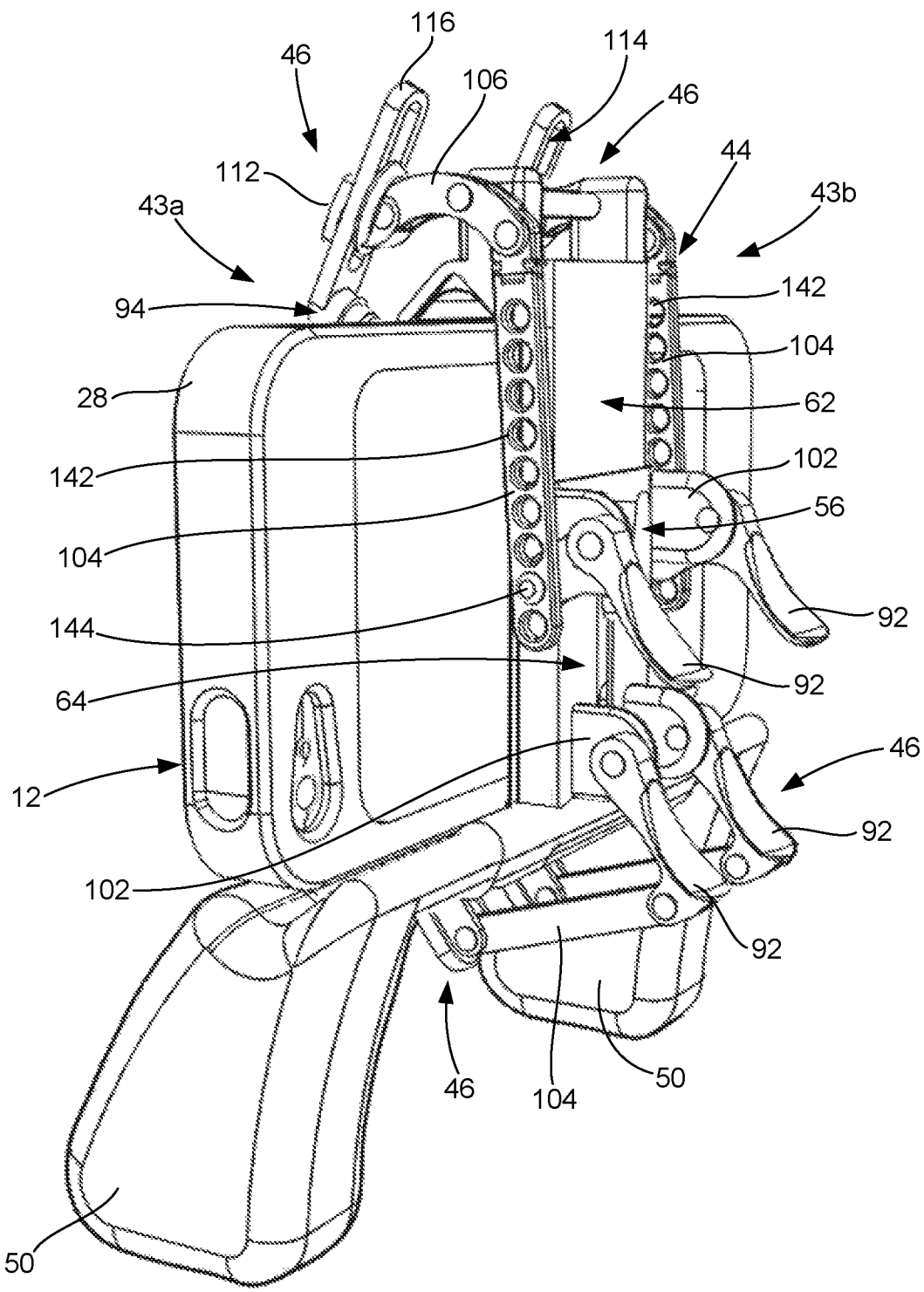
FIG. 27 is a back perspective view of a game controller for hand-held electronic devices that is configured according to a fifth embodiment of the present invention shown in use with the hand-held electronic device of FIG. 1.

FIG. 27 shows a fifth embodiment of the game controller 10 of the present invention. In this embodiment, the game controller 10 has handles 50, a pair of control assemblies 43a/43b that are connected with the first connecting member 52, second connecting member 54 and connecting mechanism 56 to operate together to play a video game 14 on a hand-held electronic device 12. The device securing mechanism 44, which is configured differently than the above-described embodiments, securely holds the electronic device 12 in the device receiving area 66 between the upper body 62 and lower body 64 by clamping the upper lip member 80 and lower lip member 84 against, respectively, the first side 34 and second side 36 of the electronic device 12, as shown in FIG. 27. Each control assembly 43a/43b of game controller 10 of FIG. 27 has upper 46a and lower 46b screen engaging devices that are structured and arranged to allow the user 22 to operate a trigger 92 to rapidly and repeatedly contact the touch screen display 16 with the capacitive tip 96 of a capacitive stylus 94. More specifically, the game controller 10 of FIG. 27 comprises the same mechanical connection between the trigger 92 and the capacitive stylus 94 as described above, namely mounting member 102, connecting rod 104, connecting arm 106, mounting surface 108, support arm 116, and adjusting mechanism 112. As shown in FIG. 27, the upper screen engaging mechanisms 46 are connected to the upper body 62 and the lower screen engaging mechanisms 46 are connected to the lower body 64 in the manner described in the above embodiments.

The embodiment of FIG. 27 utilizes a device securing mechanism 44 and upper screen engaging mechanisms 46 that are configured differently than the above-described embodiments. In this embodiment, the connecting rod 104 has a plurality of apertures 142 that are sized and configured to receive a cooperatively sized and configured engaging pin 144, as shown in FIG. 27. As above, the connecting rod 104 interconnects the trigger 92, which is attached to the upper body 62, with the connecting arm 106 in order to move the capacitive tip 96 of the capacitive stylus 94 against the touch screen display 16. In this embodiment, the connecting rod 104 is also utilized as part of the device securing mechanism 44. Without the engaging pin 144 in one of the apertures 142, the user 22 can move the upper body 62 relative to the lower body 64 to adjust the game controller 10 for the size of the electronic device 12 to engage the upper lip member 80 against the first side 34 of the electronic device and the lower lip member 84 against the second side 36 of the electronic device 12 to clamp the electronic device 12 therebetween. When the electronic device 12 is tightly held in the device receiving area 66, the user 22 places the appropriate aperture 142 over the engaging pin 144 to lock the position of the connecting rod 104 relative to the trigger 92 and tightly engage the electronic device 12 between the upper 80 and lower 84 lip members. The user 22 then tightens the connecting mechanism 56 to prevent further movement of the upper body 62 relative to the lower body 64 and tightly secure the electronic device 12 in the game controller 10, as shown in FIG. 27. When the user 22 engages a trigger 92, the downward movement of the trigger 92 will drive the connecting rod 104 upward to pivot the connecting arm 106 downward and drive the capacitive tip 96 of the capacitive stylus 94 against the touch screen display 16 to make contact with one of the control points 42 of the video game 14 so as to control a game object 40 or other aspect of the video game 14. In the embodiment shown in FIG. 27, the lower screen engaging mechanisms 46 are configured in the same manner as the above-described embodiments.

A sixth embodiment of the game controller 10 of the present invention is shown in FIGS. 28-40. In this embodiment, the game controller 10 has two control assemblies 43a and 43b that are joined together to form the single game controller 10, with the first control assembly 43a being generally toward the first end 30 of the electronic device 12 and the second control assembly 43b being generally toward the second end 32 of the electronic device 12 when the game controller 10 is being utilized to play a video game 14 on the electronic device 12, as best shown in FIG. 2. In addition to the control assemblies 43a/43b, the game controller 10 generally comprises a device securing mechanism 44 for securely holding the electronic device 10, a screen engaging mechanism 46 for engaging the touch screen display 16 at the control points 42 and a user support mechanism 48 that allows the user 22 to hold onto the game controller 10 separate from the electronic device 12, as best shown in FIGS. 28-38. As above, the user support mechanism 48 comprises a pair of handles 50 that are sized and configured to be comfortably held in the hands 26 of the user 22 while he or she is utilizing the game controller 10 to play the video game 14. In a preferred configuration, the handles 50 are configured to position the touch screen display 16 of the electronic device 12 in front of the user 22 as he or she plays the video game 14 on the electronic device 12 with the new game controller 10 of the present invention.

The device securing mechanism 44 of the present embodiment of the game controller 10 comprises an upper body 62 and a lower body 64 that are cooperatively sized and configured to define a device receiving area 66 in which an electronic device 12 is received and to securely hold the electronic device therein during use of the game controller 10 of the present invention. The device securing mechanism 44 is structured and arranged such that the upper body 62 and lower body 64 can be spread apart to an open position 68, best shown in FIGS. 29, 32, 34 and 36, which allows the user 22 to place the electronic device 12 into the device receiving area 66 or remove the electronic device 12 from the device receiving area 66, and so the upper body 62 and lower body 64 can move towards each other to a closed or clamping position 70 (when the electronic device 12 is in the device receiving area 66), best shown in FIGS. 28, 30-31, 33, 35 and 37-38, that either "closes" the device receiving area 66 or securely clamps the electronic device 12 therein. As will be readily appreciated by persons who are skilled in the relevant art, a variety of devices can be utilized to allow the user 22 to easily and quickly move the device securing mechanism 44 between its open position 68 and closed/clamping position 70.

Figure 28:
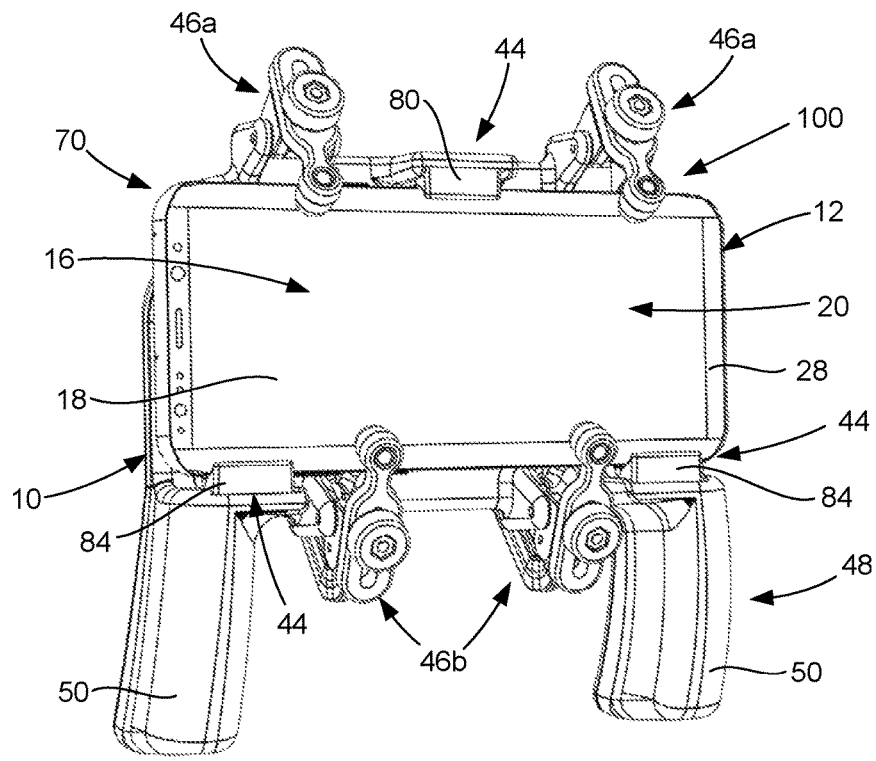
FIG. 28 is a front perspective view of a game controller for hand-held electronic devices that is configured according to a sixth embodiment of the present invention shown in use with the hand-held electronic device of FIG. 1.
Figure 31:
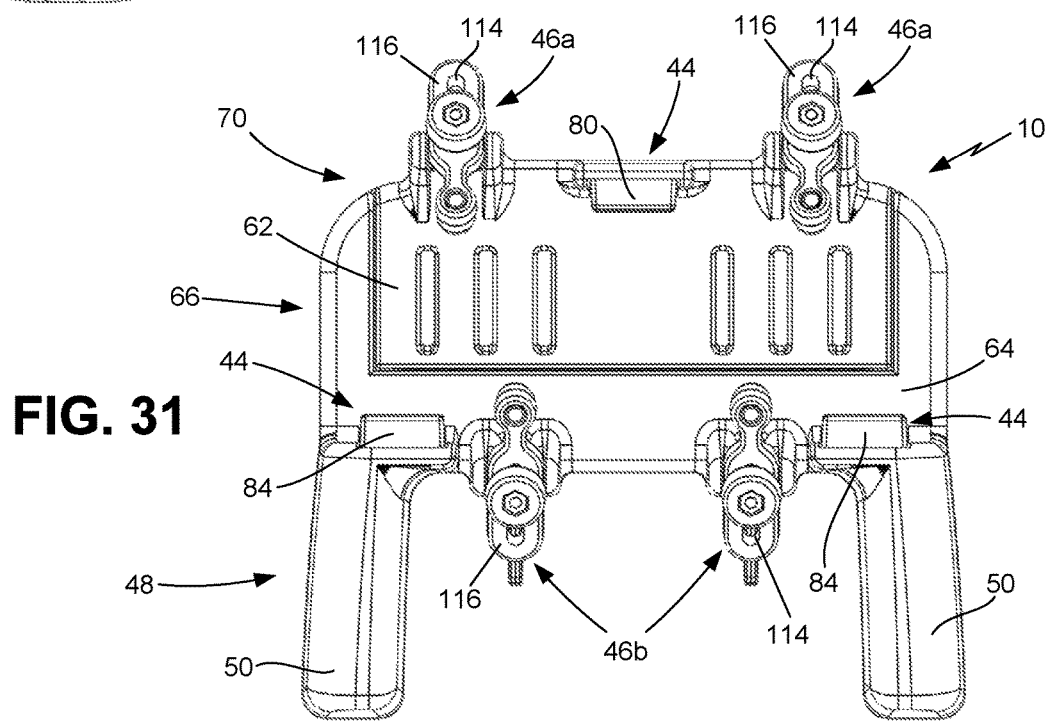
FIG. 31 is a front view of the game controller of FIG. 30.
Figure 32:
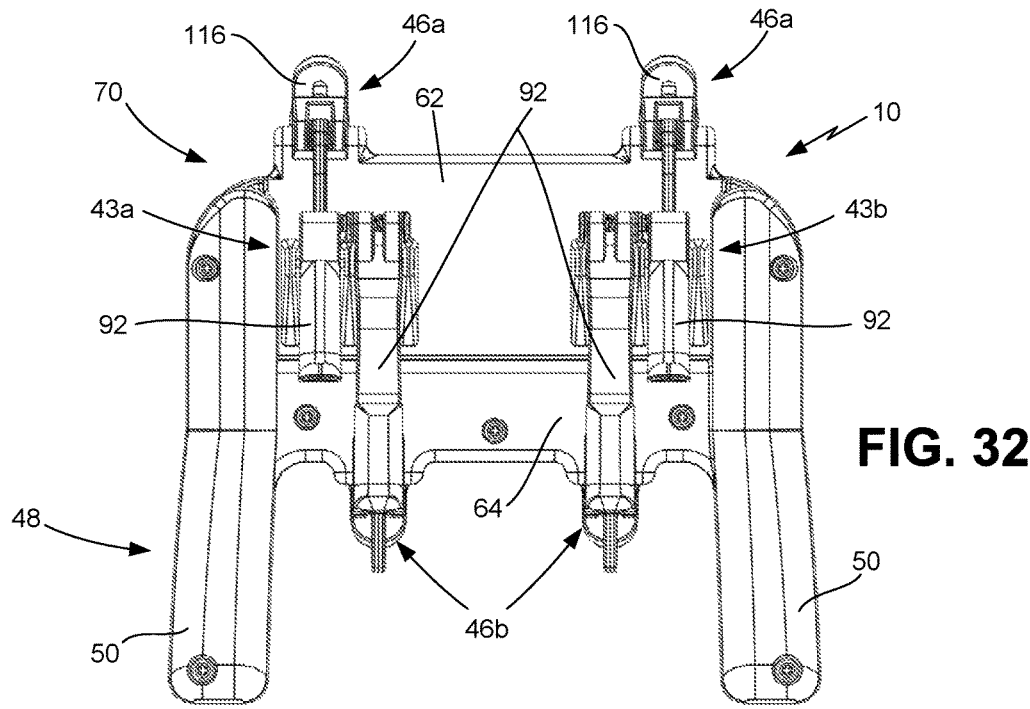
FIG. 32 is a back view of the game controller of FIG. 30.
Figure 33:
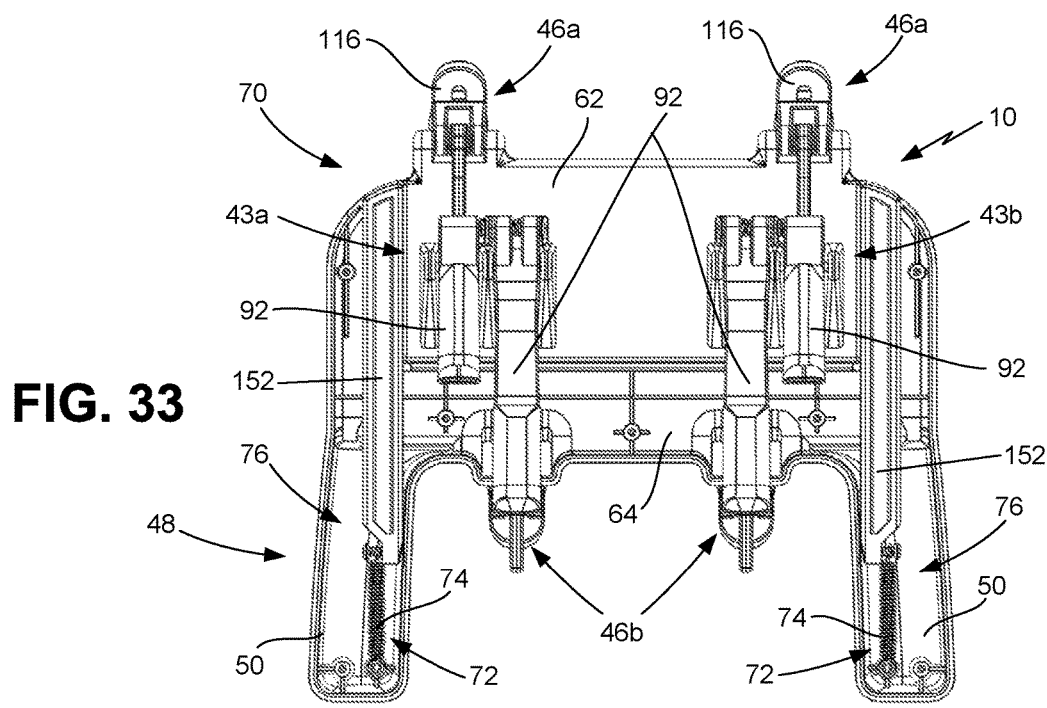
FIG. 33 is a back view of the game controller of FIG. 32 shown with a portion of the handles removed to show the biasing chamber and to show the biasing mechanism in the biasing chamber.
Figure 34:
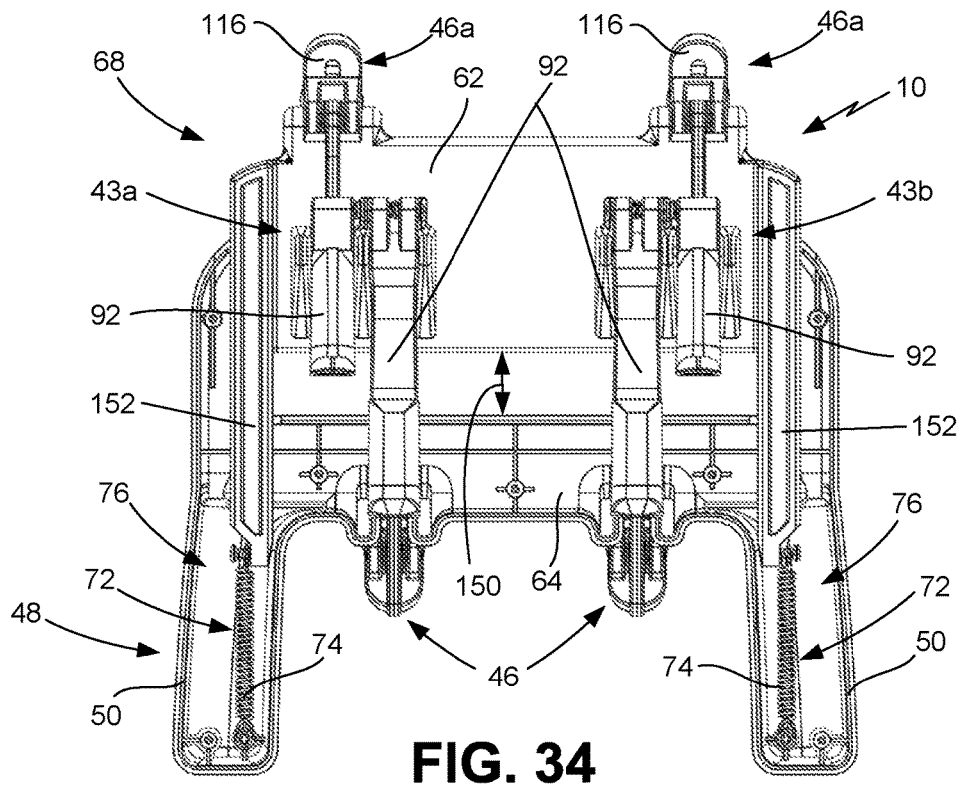
FIG. 34 is a back view of the game controller of FIG. 33 shown in its open position.
Figure 35:
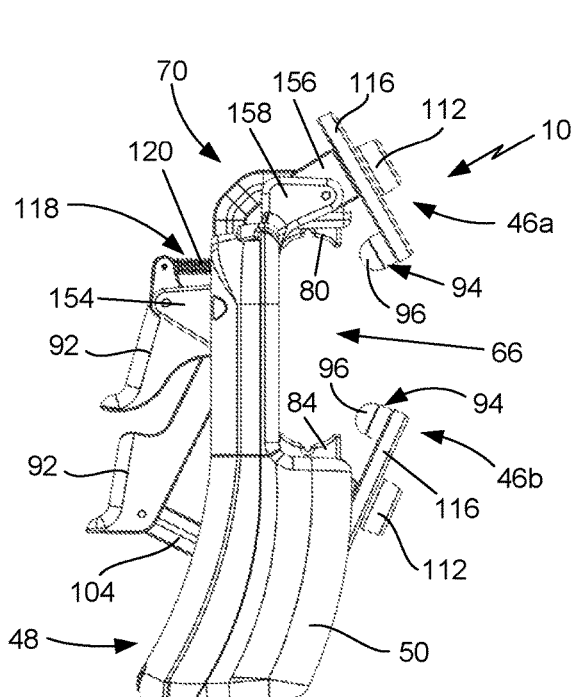
FIG. 35 is a left side view of the game controller of FIG. 30.
Figure 36:
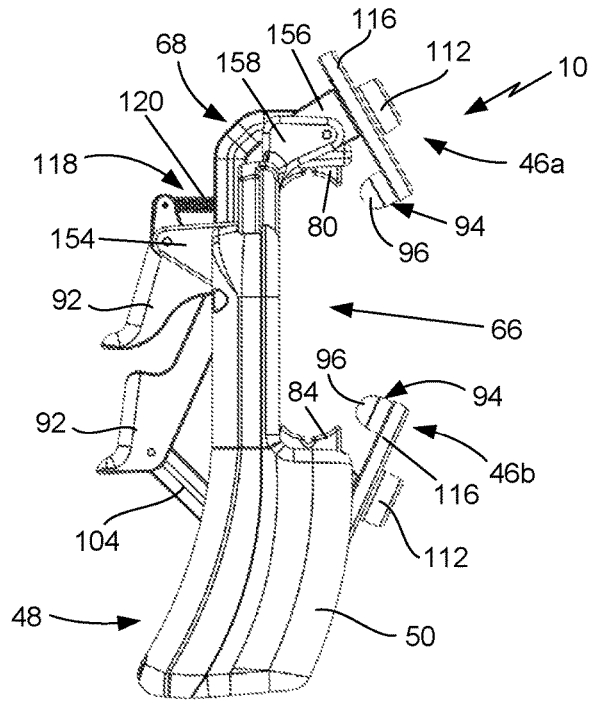
FIG. 36 is a left side view of the game controller of FIG. 35 shown in its open position.

In the embodiments shown in FIGS. 28-39, the device securing mechanism 44 comprises a biasing mechanism 72, as best shown in FIGS. 33-34, interconnecting the upper body 62 and the lower body 64 that, in a preferred configuration, is configured to bias the upper body 62 and the lower body 64 towards each other to place the securing mechanism 44 in its closed/clamping position 70. As set forth above, the biasing mechanism 72 should be selected so as to have sufficient biasing force, shown as "BF" in FIG. 3, to securely clamp the device securing mechanism 44 associated with the upper body 62 against the first side 34 of electronic device 12 and the device securing mechanism 44 associated with the lower body 64 against the second side 36 of the electronic device 12 to securely hold/clamp the electronic device 12 in the device receiving area 66 of the device securing mechanism 44 when the user 22 is playing the video game 14 or otherwise wanting to hold the electronic device 12 by the game controller 10, as shown in FIG. 28. To position the electronic device 12 into or to remove the electronic device 12 from the device receiving area 66, the user 22 spreads the upper body 62 and the lower body 64 apart by overcoming the biasing force BF of the biasing mechanism 72. The game controller 10 should be configured to allow the user 22 to relatively spread the upper body 62 and lower body 64 apart an open distance 150, shown in FIG. 34, that is sufficient to fully receive the electronic device 12 in the device receiving area 66. As such, biasing mechanism 72 should not have so much biasing force BF that the user 22 cannot overcome the biasing force BF to move the electronic device 12 in and out of the device receiving area 66. The configuration and use of a biasing mechanism 72 in the manner described above is generally well known to persons who are skilled in the relevant arts.

In a preferred configuration of the game controller 10 of the present invention, the biasing mechanism 72 of the device securing mechanism 44 is a spring 74 that interconnects the upper body 62 and lower body 64, as best shown in FIGS. 33-34. As shown in these figures (which has a portion of the handles 50 removed to illustrate the features of the biasing mechanism 72) the spring 74 interconnects the upper body 62 and the lower body 64 inside the biasing chamber 76 such that the upper body 62 will move, relative to the lower body 62, generally in an upward and downward direction to, respectively, place the game controller 10 in its open position 68 or its closed/clamping position 70. As set forth above, movement of the upper body 62 relative to the lower body 64 results from either the biasing force BF from the spring 74 (downward direction) or overcoming the biasing force BF (upward movement) by the application of a spreading force applied by the user 22 to place the electronic device 12 into or remove it from the device receiving area 66. As best shown in FIGS. 33-34, the spring 74 is attached to the lower ends of the handles 50, which are attached to or integral with the lower body 64, and the upper body 62 via a pair of connecting members 154, which are attached to or integral with the upper body 62.

To secure the electronic device 12 inside the device securing area 66, the upper body 62 and the lower body 64 of the device securing mechanism 44 comprise components that enable the game controller 10 to securely hold onto the electronic device 10. In the embodiments shown in the figures, the upper body 62 has one or more inwardly extending upper lip members 80 that are attached to or integral with the upper body 62 and sized and configured to extend into the device receiving area 66 so the upper lip member(s) 80 will abut against the first side 34 of the electronic device 12, as best shown in FIGS. 28-31 and 35-38, when the game controller 10 is utilized with electronic device 12. The lower body 64 has one or more inwardly extending lower lip members 84 that are attached to or integral with the lower body 64 and are sized and configured to extend into the device receiving area 66 so as to abut against the second side 34 of the electronic device 12, as shown in FIGS. 28-31 and 35-38, when the game controller 10 is utilized with an electronic device 12.

In the present embodiment, components of the control assemblies 43a/43b are attached to or integral with the upper body 62, which is moveably engaged with the lower body 64 so as to allow the user 22 to move the upper body 62 upward relative to the lower body 64. As best shown in FIGS. 35-38 and 40, the trigger mounting member 154 is attached to or integral with the upper body 62. In the configuration shown in the figures, the upper body 62 will slide upward and downward relative to the lower body 64, which is attached to or integral with the handles 50 of the user support mechanism 48. One advantage of associating all of the triggers 92 of the control assemblies 43a/43b with the upper body 62 is with regard to use of larger sized electronic devices 12 with the new game controller 10. As will be readily appreciated by persons who use such larger sized electronic devices 12, when these electronic devices 12 are placed inside the device receiving area 66 the upper body 62 and lower body 64 will spread apart an amount that, depending on the size of the electronic device 12, could be somewhat significant. If the lower triggers 92 where associated with the lower body 64, this spread could make it difficult for the user 22 to comfortably operate the triggers 92 while playing the video game 14. By having all of the triggers 92 associated with the upper body 62 (or alternatively the lower body 64), the relative distance of the triggers 92 to each other will be maintained no matter how wide the spread between the upper body 62 and lower body 64, as best shown with regard to the movement of the game controller 10 from the closed position 70 to the open position 68 shown in FIGS. 35 and 36.

As set forth above, the screen engaging mechanism 46 is structured and arranged to be operated by the user 22 to contact the touch screen display 16 of the electronic device 12 at the control points 42 in a manner that operates or controls various aspects of the video game 14, including as applicable a game object 40. The screen engaging mechanism 46 of the game controller 10 of the present embodiment is structured and arranged to rapidly and repeatedly touch one or more of the control points 42 so the user 22 can effectively and enjoyably play the video game 14 on the electronic device 12. As with the embodiments set forth above, the screen engaging mechanisms 46 of the sixth embodiment is able to accomplish the desired objectives in a manner that does not require any batteries, electronic connections or the like. As set forth below, the new game controller 10 has a plurality of control assemblies 43a/43b, each with one or more screen engaging devices 46 that are configured to contact the touch screen display 16 and engage the control points 42. The control assemblies 43a/43b of the new game controller 10 comprises an upper screen engaging device 46a and a lower screen engaging device 46b, as best shown in FIGS. 28-39.

Figure 37:
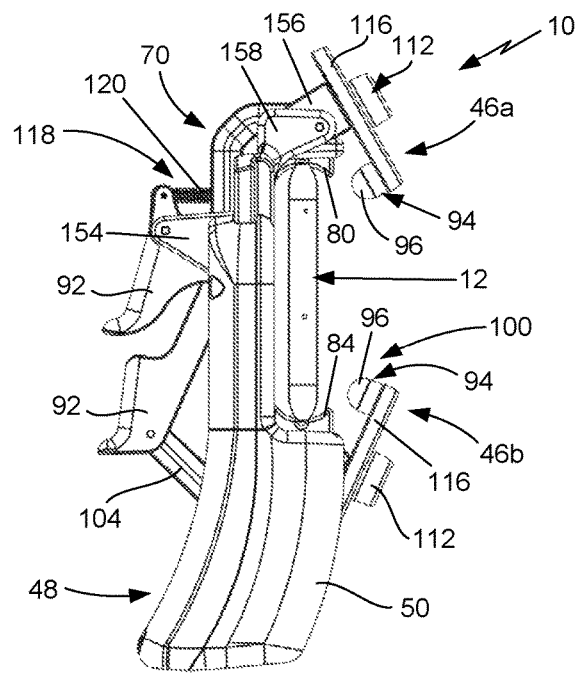
FIG. 37 is a left side view of the game controller of FIG. 36 shown in its closed position with a hand-held electronic device secured by the device securing mechanism in the device receiving area.
Figure 38:
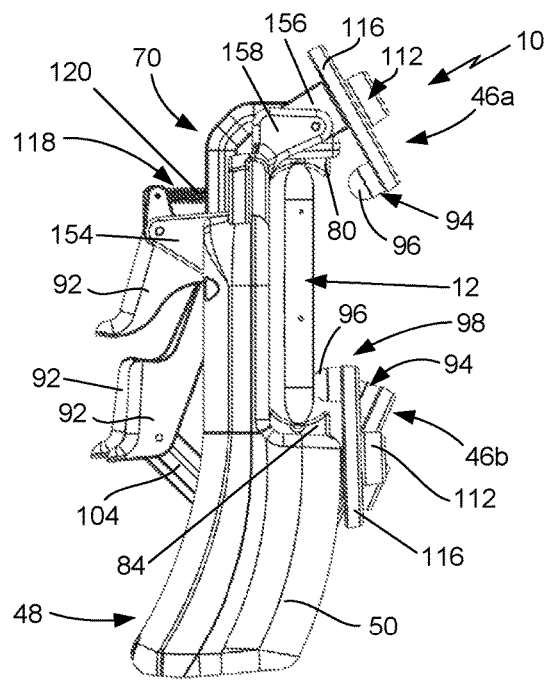
FIG. 38 is a left side view of the game controller of FIG. 37 shown with one of the lower screen engaging mechanisms in its engaged position against the upper surface of the hand-held electronic device.

The screen engaging devices 46 of the present invention comprise a trigger 92 that is mechanically connected to a capacitive stylus 94 (which has a capacitive tip 96), as best shown in FIGS. 32-39, such that when the user 22 engages the trigger 92 with one of his or her fingers 24, the capacitive tip 96 of the capacitive stylus 94 will directed against the touch screen display 16 at one of the control points 42, as shown in FIG. 2, to place the screen engaging device 46 in an engaged position 98, as shown in FIG. 38. When the user 22 releases the trigger 92, the mechanical connection will pivot the capacitive stylus 94 to move the capacitive tip 96 thereof away from the touch screen display 16, thereby placing the screen engaging device 46 in a disengaged position 100, as shown in FIG. 37. As will be readily appreciated by persons skilled in the art, in order for a mechanical device or object to operatively engage a touch screen display 14 of electronic device 12, the device or object must have a capacitive tip 96 to engage capacitive touch screens that are utilized in hand-held electronic devices 12 as the touch screen display 16. As set forth above, the capacitive tip 96 of the capacitive stylus 94 allows the touch screen display 16 to distinguish and sense specific touch locations that would otherwise be based on the electrical impulses in a human body (i.e., normally through the fingertip of fingers 24).

Figure 29:
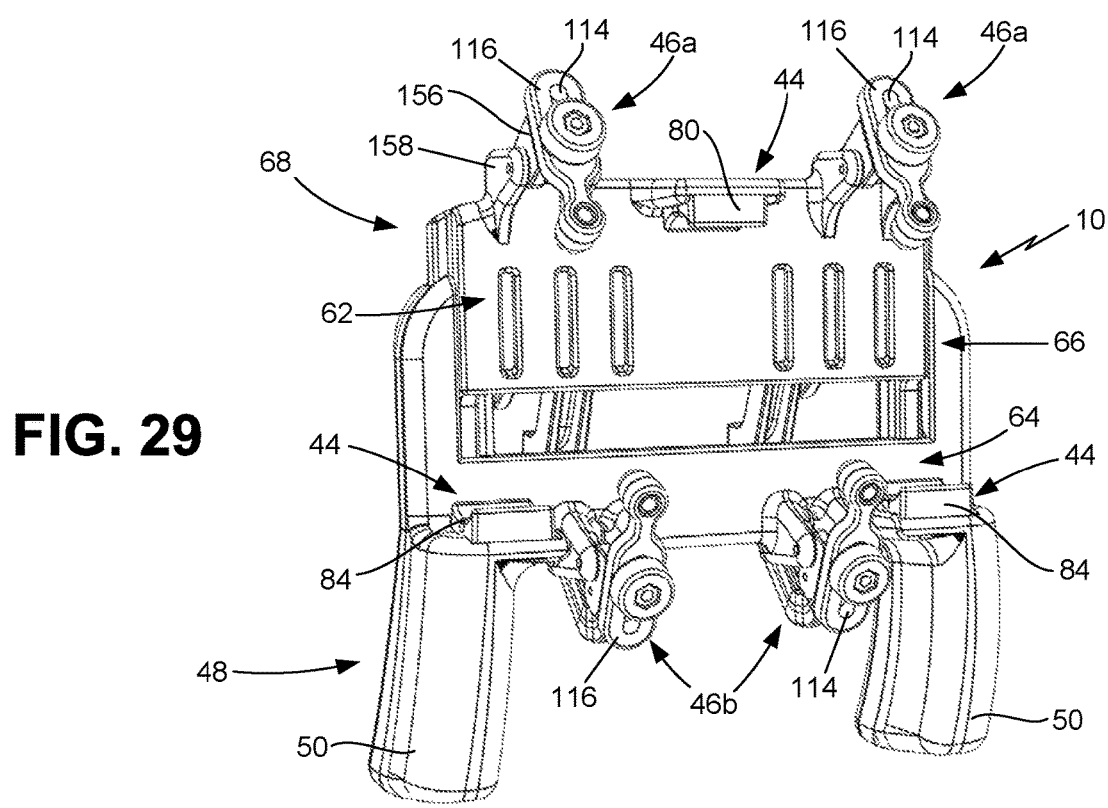
FIG. 29 is a front perspective view of the game controller of FIG. 28 shown in its open position without the hand-held electronic device.
Figure 30:
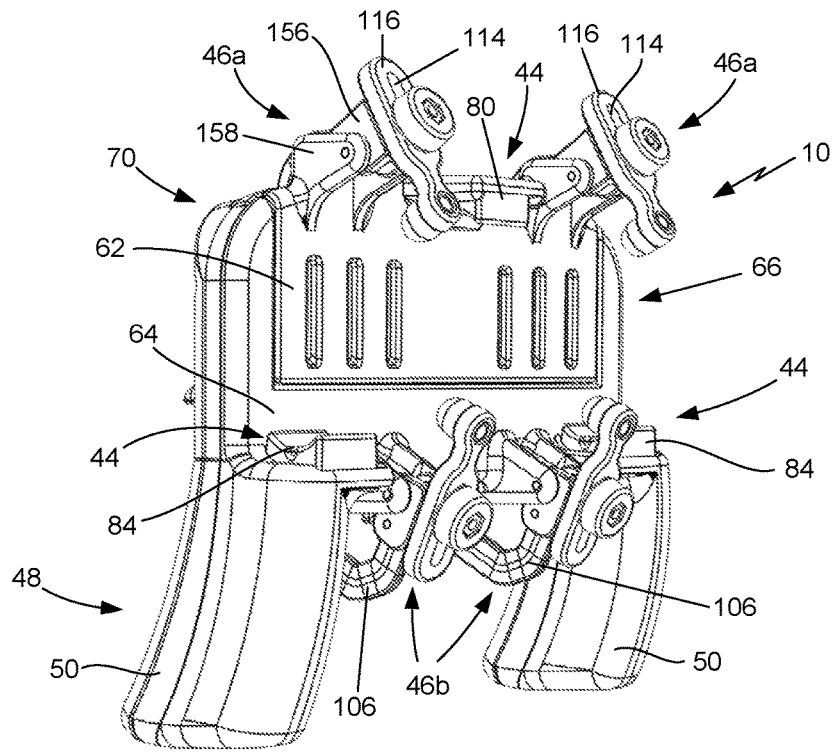
FIG. 30 is a front perspective view of the game controller of FIG. 29 shown in its closed position.

In a preferred embodiment of the game controller 10 of the present invention, each of the screen engaging mechanisms 46 are similarly configured. For purposes of describing the present embodiment, reference is made to the upper screen engaging mechanism 46a of the second control assembly 43b, which is illustrated in FIGS. 35-38. As best shown in FIGS. 29-30, 35-38 and 40, the trigger 92 is pivotally attached to a trigger mounting member 154 that is attached to or integral with the upper body 62 so as to pivot relative to the upper body 62 when the user 22 engages the trigger 92 with one of his or her fingers 24. The trigger 92 is also attached to a proximal end of a stiff connecting arm 106 (which in this embodiment, is a combination of the connecting rod 104 and connecting arm 106 shown in the embodiment FIGS. 11-12). The opposite, or distal, end of the connecting arm 106 is attached to the screen engaging mechanism 46, which is connected to the upper body 62 by a stylus support member 156 having a mounting surface 108 (best shown in FIGS. 11-12) thereon. The mounting surface 108 of the stylus support member 156 has an aperture that is configured to receive the threaded mounting member 110 of the adjusting mechanism 112 (also best shown in FIGS. 11-12), with the mounting member 110 extending through a slot 114 in a support/sliding arm 116 that supports the capacitive stylus 94 at one end thereof, as best shown in FIGS. 29 and 31. Pins or like elements (not specifically identified in the figures) are utilized to connect the trigger 92 to the trigger mounting member 154, the trigger 92 to the connecting arm 106, the connecting arm 106 to the stylus support member 156, and the stylus support member 156 to a stylus mounting member 158 (shown in FIGS. 35-38) that is attached to or integral with the upper body member 62. The aperture in the mounting surface 108 of the stylus support member 156 is threaded to threadably receive the mounting member 110 of the adjusting mechanism 112, which be a knob or like device that is easy for the user 22 to rotate to loosen the adjusting mechanism 112 from the mounting surface 108. When tightened into the aperture in the mounting surface 108 of the stylus support member 156, the adjusting mechanism 112 secures the support arm 116 in a desired position to place the tip 96 of the stylus 94 at the location of a control point 42. The user 22 loosens the adjusting mechanism 112 to allow the support arm 116 to slide up or down and to rotate it left and right, via the slot 114 through which the mounting member 110 extends, to allow the user 22 to position the capacitive tip 96 at a control point 42, which are likely to vary for different video games 14.

The screen engaging mechanism 46 of the present embodiment is configured such that the default position (i.e., when the user 22 is not engaging the trigger 92) is the disengaged position 100, which is in spaced apart relation to the touch screen display 16 of the electronic device 12. In this manner, the capacitive tip 96 only contacts the touch screen display 16 at the control point 42 when the user 22 squeezes (typically) or otherwise engages the trigger 92. When the user 22 engages the trigger 92, the trigger 92 will pivot to push the distal end of the connecting arm 106 inward and pivot the stylus support member 156 so as to direct the capacitive tip 96 of the capacitive stylus 94 against the touch screen display 16 at one of the control points 42 thereof (the second control point 42b for the upper screen engaging mechanism 46a of the second control assembly 43b). In use, the user 22 will be able to rapidly squeeze the trigger 92 with his or her finger 24 to make rapid, repeated contact against one of the control points 42 to control the video game 14 and/or affect one of the game objects 40 thereof.

With regard to the other screen engaging mechanisms 46, namely the upper screen engaging mechanism 46a of the first control assembly 43a and the two lower screen engaging mechanisms 46b, preferably the components thereof are configured as set forth above for the upper screen engaging mechanism 46a of the second control assembly 43b. The upper screen engaging mechanism 46a of the first control assembly 43a is configured as described above so that the capacitive tip 96 thereof will selectively contact the first control point 42a. With regard to the lower screen engaging mechanisms 46b, the trigger 92 is pivotally attached to a trigger mounting member 154 that is attached to or integral with the upper body 62, as best shown in FIGS. 32-34, so as to pivot relative to the upper body 62 when the user 22 engages the trigger 92 with one of his or her fingers 24. As described above, the trigger 92 is also attached to a stiff connecting arm 106 (which is also a combination of the connecting rod 104 and connecting arm 106 of the embodiment of FIGS. 11-12) that extends under the lower body 64 to connect at its distal end to the stylus support members 156 of the lower screen engaging mechanisms 46b. As generally described above, the stylus support members 156 pivot relative to stylus mounting members 158, which are attached to or integral with the lower body 64, to direct the capacitive tips 96 of the capacitive styluses 94 against the touch screen display 16 at one or more of the lower control points 42 thereof (namely, the third control point 42c and/or fourth control point 42d for the lower screen engaging mechanisms 46b).

Figure 40:
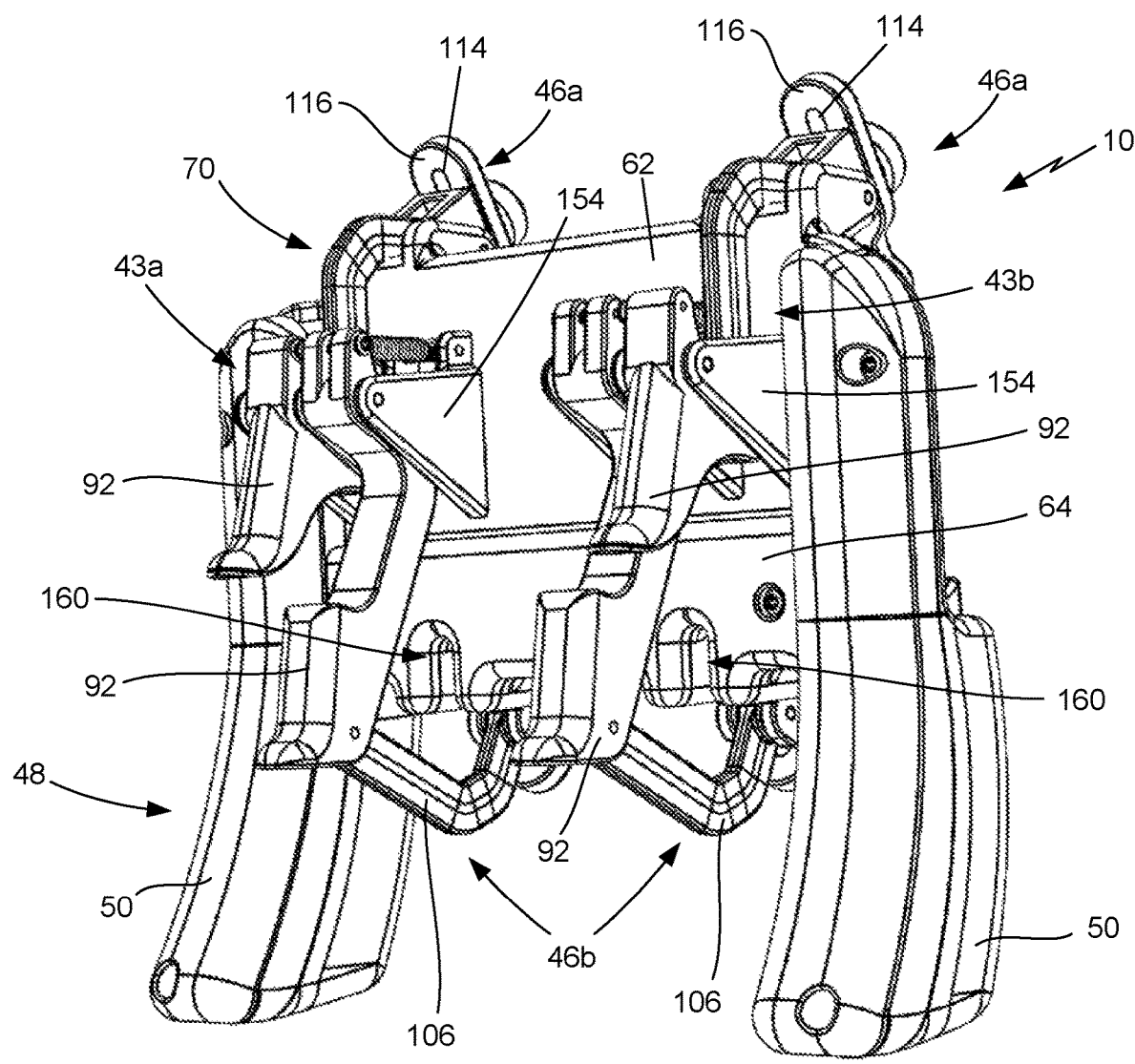
FIG. 40 is a back perspective view of the game controller of FIG. 30.

As set forth above, to compensate for larger sized electronic devices 12, all of the triggers 92 are associated with the upper body 62 so the triggers 92 will maintain there respective positioning even when such electronic devices 12 are used with the new game controller 10. As set forth above, however, the connecting arms 106 of the lower screen engaging mechanisms 46b extend under the lower body 64 to interconnect the triggers 92 to their respective stylus mounting member 158, as best shown in FIGS. 30 and 40. To avoid issues with regard to the lower connecting arms 106 contacting or otherwise having their movement interfered with by the lower body 64 when the game controller 10 is utilized with a larger sized electronic device 12, the present invention includes a pair of slots 160 in the lower end of the lower body 64, as best shown in FIG. 40. The slots 160 are sized and configured to allow the connecting arms 106 to move freely in response to the user 22 engaging the triggers 50 while playing the video game 14. When the upper body 62 is moved upward to allow use of a larger sized electronic device 12, the slots 160 will allow the connecting arms 106 to operate as desired without any interference by the lower body 64. Specifically, engagement of the lower triggers 50 by the user 22 will cause the lower connecting arms 106 to properly move in response to such engagement to drive the capacitive tips 96 of the lower screen engaging mechanisms 46b against the lower control points, shown as control points 42c/42d, of touch screen display 16.

Figure 39:
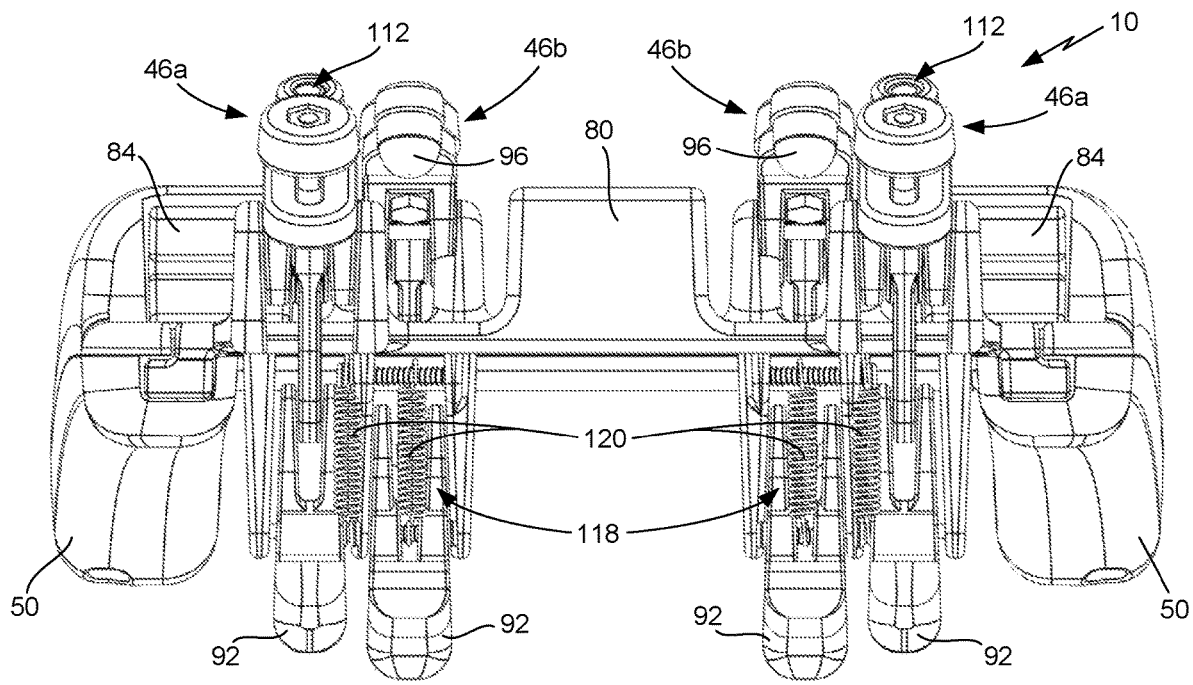
FIG. 39 is a top view of the game controller of FIG. 30 particularly illustrating the trigger tensioning mechanism thereof.

To prevent the capacitive tip 96 from contacting the touch screen display 16 when the user 22 has not squeezed or otherwise engaged the trigger 92, the preferred embodiment of the present invention has a trigger tensioning mechanism 118 that is configured to apply a biasing force to the trigger 92, directly or indirectly, that will keep the capacitive tip 96 in spaced apart relation to the touch screen display 16 (i.e., keep the screen engaging mechanism 46 in the disengaged position 100). Examples of trigger tensioning mechanisms 118 that can be utilized with the game controller 10 of the present invention is shown in FIG. 39. In the embodiment of FIG. 39, the trigger tensioning mechanism 118 comprises a torsion spring 120 associated with each trigger 92. The torsion spring 120 should be selected so as to bias the trigger 92 in a manner that will pull the distal end of the connecting arm 106 outward and, therefore, pull the capacitive tip 96 of the capacitive stylus 94 away from the touch screen display 16 (i.e., the disengaged position 100) when the electronic device 12 is in the device receiving area 66 and the trigger 92 is not engaged by the user 22. In use, the user 22 presses against one of the triggers 92 with sufficient force to overcome the biasing force of the torsion spring 120, which will push the connecting arm 106 associated therewith inward and drive the associated capacitive tip 96 against the touch screen display 16 to contact one of the control points 42 of the video game 14.

As will be readily appreciated by persons who are skilled in the relevant arts, a wide variety of devices may be utilized for the trigger tensioning mechanism 118. For instance, the trigger tensioning mechanism 118 can be incorporated into the structure of the trigger 92 itself and/or incorporated into the connecting arm 106 or the support arm 116 to, as a default position, maintain the capacitive tip 96 in spaced apart relation to the touch screen display 16 and the screen engaging mechanism 46 in its disengaged position 100. Any such trigger tensioning mechanism 118 should be configured to maintain the disengaged position 100 until the user 22 applies force to the trigger 92 when he or she desires the capacitive tip 96 to contact the touch screen display 16 at a control point 42 to affect the video game 14 in the desired manner (i.e., shoot a weapon). As such, the trigger tensioning mechanisms 118 described above are for exemplary purposes only and are not intended to limit the scope of the present invention.

In use, the user 22 places the hand-held electronic device 12 in the device receiving area 66 between the upper body 62 and lower body 64 sections of the new game controller 10 and then utilizes the device securing mechanism 44 to secure the electronic device in the game controller 10. The control assemblies 43a/43b are moved so the screen engaging mechanisms 46 are positioned where the capacitive tips 96 of each capacitive stylus 94 will contact a control point 42 of the video game 14. If the control assemblies 43a/43b are connected by connecting members 52/54, the user 22 tightens the connecting mechanism 56 to secure the position of the screen engaging mechanisms 46. To play a video game 14 on the electronic device 12, the user 22 holds the game controller 10 by the handles 50 or, if the handles 50 are not utilized, the user 22 holds the electronic device 12 itself. When the user 22 engages one of the triggers 92, the trigger 92 will pivot to push the connecting arm 106 in a manner such that the support arm 116 drives the capacitive tip 96 of the capacitive stylus 94 against the touch screen display 16 at the control point 42. Contact by the capacitive tip 96 against a control point 42 will affect a game object 40 of the video game 14 and/or otherwise affect the video game 14 in a manner desired by the user 22.

In the preferred configurations of the present invention, the handles 50 (when utilized) are ergonomically configured so as to be comfortable in the user's hands 26 and allow him or her to comfortably reach the triggers 92 with his or her fingers 24. As set forth above, the game controller 10 can be configured with one or more control assemblies 43a/43b, each with one or more screen engaging mechanisms 46 as may be necessary to make contact with the control points 42 of the video game 14. In some embodiments, the user 22 may want or need to utilize one or more of his or her "non-trigger" fingers to directly contact one or more of the control points 42 that are not aligned or otherwise associated with a capacitive tip 96 of the game controller 10. The various components of the new game controller 10 can be made out of a wide variety of materials. In one embodiment, the game controller 10 is primarily made out of a light weight, strong plastic. The portions of the game controller 10 that will be or are likely to be positioned in front of the useable screen area 18 of the touch screen display 16, which is where the video game 14 will be displayed, are made out of a transparent material to reduce any visual interference for the user 22 when he or she is using the game controller 10 to play the video game 14.

As will be readily appreciated by persons who are skilled in the art, the new game controller 10 allows the user 22 thereof to more efficiently and more comfortably play video games 14 on a hand-held electronic device 12 having a touch screen display 16. In addition, the new game controller 10 will allow for the development of more complicated and challenging video games 14 due to the greater control it affords the user/player 22 and the additional control points 42 that can be handled by the user 22. Because of the ability of the user 22 to adjust hand positions, the new game controller 10 should also lessen the risk of repetitive motion hand injuries.

While there are shown and described herein specific forms of the invention, it will be readily apparent to those persons who are skilled in the relevant art that the invention is not so limited, but is susceptible to various modifications and rearrangements in design and materials without departing from the spirit and scope of the invention. In particular, it should be noted that the present invention is subject to modification with regard to any dimensional relationships set forth herein and modifications in assembly, materials, size, shape and use. For instance, there are numerous components described herein that can be replaced with equivalent functioning components to accomplish the objectives of the present invention.

What is claimed is:

1. A game controller for playing a video game on a hand-held electronic device having a touch screen display, said game controller comprising:

at least one control assembly having a device securing mechanism and a screen engaging mechanism, said device securing mechanism structured and arranged to hold the electronic device in a device receiving area of said game controller with the touch screen display being directed toward a user who is utilizing said game controller to play the video game on the electronic device when said device securing mechanism is in a closed position and to allow the electronic device to be removed from the device receiving area when said device securing mechanism is in an open position, said device securing mechanism having an upper body moveably disposed relative to a lower body, said screen engaging mechanism having a rigid connecting arm interconnecting a trigger and a capacitive stylus supporting a capacitive tip, said trigger pivotally connected to one of said upper body and said lower body of said device securing mechanism, said capacitive stylus of said screen engaging mechanism pivotally connected to one of said upper body and said lower body, said connecting arm of said screen engaging mechanism structured and arranged to move said capacitive tip of said capacitive stylus from a disengaged position with said capacitive tip in spaced apart relation to the touch screen display to an engaged position with said capacitive tip pressed against the touch screen display when the user engages said trigger operatively connected to said capacitive tip so as to direct said capacitive tip to contact a control point of the video game and affect the video game and/or one or more game objects thereof and to move said capacitive tip back to said disengaged position when the user disengages said trigger.

2. The game controller of claim 1, wherein said device securing mechanism comprises one or more upper lip members attached to or integral with said upper body and one or more lower lip members attached to or integral with said lower body, said device receiving area being defined between said one or more upper lip members and said one or more lower lip members.

3. The game controller of claim 2 further comprising a biasing mechanism interconnecting said upper body and said lower body, said biasing mechanism structured and arranged to bias said upper lip member and said lower lip member toward each other with said upper lip member against a first side of the electronic device and said lower lip member against a second side of the electronic device to clamp the electronic device between said upper lip member and said lower lip member when said game controller is utilized to hold the electronic device.

4. The game controller of claim 3 further comprising a connecting member attached to one of said upper body and said lower body, said connecting member structured and arranged to interconnect said one of said upper body and said lower body to said biasing mechanism, said biasing being connected to the other of said upper body and said lower body.

5. The game controller of claim 4, wherein said connecting member is attached to or integral with said upper body and said biasing mechanism is attached to or integral with a handle that is attached to or integral with said lower body.

6. The game controller of claim 1 further comprising one or more handles attached to or integrally formed with one of said upper body and said lower body of said device securing mechanism, said handles being sized and configured to be held by the user when the user is utilizing said game controller to play the video game on the electronic device.

7. The game controller of claim 1, wherein said capacitive stylus is attached to or integral with a support arm that is slidably engaged with a stylus support member connected to said connecting arm so as to allow the user to adjust the position of said capacitive tip relative to the touch screen display of the electronic device.

8. The game controller of claim 7 further comprising a mounting surface associated with said stylus support member and a mounting member attached to an adjusting mechanism associated with said support arm, said mounting member disposed through a slot in said support arm so as to allow said support arm to move relative to said mounting surface and then to be clamped thereto to fixedly position said capacitive tip.

9. The game controller of claim 8, wherein said adjusting mechanism is cooperatively configured with said support arm to allow said support arm to pivot relative to said stylus support member to allow the user to place said capacitive tip of said screen engaging mechanism in corresponding position with the control point on the touch screen display of the electronic device.

10. The game controller of claim 1 further comprising a trigger tensioning means associated with said screen engaging mechanism for biasing said trigger to said disengaged position so as to position said capacitive tip in spaced apart relation to the touch screen display when the user releases pressure from said trigger.

11. The game controller of claim 1, wherein said game controller comprises a first control assembly and a second control assembly, each of said first control assembly and said second control assembly having one or more of said screen engaging mechanisms.

12. A game controller for playing a video game on a hand-held electronic device having a touch screen display, said game controller comprising:

at least one control assembly having a device securing mechanism and one or more screen engaging mechanisms, wherein said device securing mechanism comprises an upper body having one or more upper lip members and a lower body having one or more lower lip members, said upper body and said lower body defining a device receiving area between said upper lip member and said lower lip member, said device securing mechanism structured and arranged to hold the electronic device in said device receiving area of said game controller with the touch screen display being directed toward a user who is utilizing said game controller to play the video game on the electronic device when said device securing mechanism is in a closed position with said upper lip against a first side of said electronic device and said lower lip against a second side of said electronic device and to allow the electronic device to be removed from the device receiving area when said device securing mechanism is in an open position with at least one of said upper lip members and said lower lip members being in spaced apart relation to the electronic device, wherein each of said screen engaging mechanisms comprise a trigger associated with one of said upper body and said lower body, a capacitive stylus associated with one of said upper body and said lower body and a connecting arm interconnecting said trigger and said capacitive stylus so as to operatively connect said trigger to a capacitive tip supported by said capacitive stylus, said capacitive stylus attached to or integral with a support arm that is slidably engaged with a stylus support member connected to said connecting arm so as to allow the user to adjust the position of said capacitive tip relative to the touch screen display of the electronic device, said capacitive tip configured to operatively engage the touch screen display of the electronic device, each of said trigger, said connecting arm and said capacitive stylus being structured and arranged to move said capacitive tip from a disengaged position with said capacitive tip in spaced apart relation to the touch screen display to an engaged position with said capacitive tip pressed against the touch screen display when the user applies pressure to said trigger so as to contact a control point of the video game with said capacitive tip so as to affect the video game and/or one or more game objects thereof while the user is holding said game controller and to move said capacitive tip back to said disengaged position when the user releases pressure from said trigger.

13. The game controller of claim 12 further comprising a mounting surface associated with said stylus support member and a mounting member attached to an adjusting mechanism associated with said support arm, said mounting member disposed through a slot in said support arm so as to allow said support arm to move relative to said mounting surface and then to be clamped thereto to fixedly position said capacitive tip.

14. The game controller of claim 13, wherein said adjusting mechanism is cooperatively configured with said support arm to allow said support arm to pivot relative to said stylus support member to allow the user to place said capacitive tip of said screen engaging mechanism in corresponding position with the control point on the touch screen display of the electronic device.

15. The game controller of claim 12 further comprising a trigger tensioning means associated with said screen engaging mechanism for biasing said trigger to said disengaged position so as to position said capacitive tip away from the touch screen display when the user releases pressure from said trigger.

16. The game controller of claim 12 further comprising a biasing mechanism interconnecting said upper body and said lower body, said biasing mechanism structured and arranged to bias said upper lip member and said lower lip member toward each other with said upper lip member against the first side of the electronic device and said lower lip member against the second side of the electronic device as to clamp the electronic device between said upper lip member and said lower lip member when said game controller is utilized to hold the electronic device for playing the video game.

17. The game controller of claim 16 further comprising a connecting member attached to one of said upper body and said lower body, said connecting member structured and arranged to interconnect said one of said upper body and said lower body to said biasing mechanism, said biasing mechanism being connected to the other of said upper body and said lower body.

18. The game controller of claim 12 further comprising one or more handles attached to or integrally formed with one of said upper body and said lower body of said device securing mechanism, said handles being sized and configured to be held by the user when the user is utilizing said game controller to play the video game on the electronic device.

19. A game controller for playing a video game on a hand-held electronic device having a touch screen display, said game controller comprising:

at least one control assembly having a device securing mechanism, an upper screen engaging mechanism and a lower screen engaging mechanism; and one or more handles attached to or integral with said device securing mechanism, wherein said device securing mechanism comprises an upper body having an upper lip member and a lower body having a lower lip member, said upper body and said lower body defining a device receiving area between said upper lip member and said lower lip member, said device securing mechanism structured and arranged to hold the electronic device in said device receiving area of said game controller with the touch screen display being directed toward a user who is utilizing said game controller to play the video game on the electronic device when said device securing mechanism is in a closed position with said upper lip against a first side of said electronic device and said lower lip against a second side of said electronic device and to allow the electronic device to be removed from the device receiving area when said device securing mechanism is in an open position with at least one of said upper lip and said lower lip in spaced apart relation to the electronic device, wherein said upper screen engaging mechanism comprises a trigger associated with one of said upper body and said lower body, a capacitive stylus associated with said upper body and a connecting arm interconnecting said trigger and said capacitive stylus so as to operatively connect said trigger to a capacitive tip supported by said capacitive stylus, said capacitive tip configured to operatively engage the touch screen display of the electronic device, wherein said lower screen engaging mechanism comprises a trigger associated with one of said upper body and said lower body, a capacitive stylus associated with said lower body and a connecting arm interconnecting said trigger and said capacitive stylus so as to operatively connect said trigger to a capacitive tip supported by said capacitive stylus, said capacitive tip configured to operatively engage the touch screen display of the electronic device, wherein each of said upper screen engaging mechanism and said lower screen engaging mechanism are structured and arranged to respectively move said capacitive tip from a disengaged position with said capacitive tip in spaced apart relation to the touch screen display to an engaged position with said capacitive tip pressed against the touch screen display when the user applies pressure to said trigger so as to contact a control point of the video game with said capacitive tip so as to affect the video game and/or one or more game objects thereof while the user is holding one of said game controller and the electronic device and to move said capacitive tip back to said disengaged position when the user releases pressure from said trigger of said upper screen engaging mechanism or said lower screen engaging mechanism.

\* \* \* \* \*